(12) United States Patent
Zhou et al.

(10) Patent No.: US 9,217,793 B2
(45) Date of Patent: Dec. 22, 2015

(54) APPARATUS AND METHOD FOR DETECTING RADIATION

(71) Applicant: SCHLUMBERGER TECHNOLOGY CORPORATION, Sugar Land, TX (US)

(72) Inventors: Zilu Zhou, Needham, MA (US); Bradley A. Roscoe, Cambridge, MA (US); Markus Berheide, Medford, MA (US); Joshua Wayne Gibson, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 146 days.

(21) Appl. No.: 13/660,916

(22) Filed: Oct. 25, 2012

(65) Prior Publication Data

US 2014/0117246 A1 May 1, 2014

(51) Int. Cl.
- H01J 47/00 (2006.01)
- G01T 1/185 (2006.01)
- G01T 3/00 (2006.01)

(52) U.S. Cl.
CPC ............... G01T 1/185 (2013.01); G01T 3/008 (2013.01)

(58) Field of Classification Search
CPC .................................. G01T 1/184; G01T 3/008
USPC .......................................................... 250/374
See application file for complete search history.

(56) References Cited

U.S. PATENT DOCUMENTS

| | | | |
|---|---|---|---|
| 3,461,291 A | 8/1969 | Goodman | |
| 3,483,376 A | 12/1969 | Locke et al. | |
| 3,614,437 A * | 10/1971 | Allemand et al. | ............ 376/153 |
| 3,786,270 A * | 1/1974 | Borkowski et al. | ......... 250/385.1 |
| 3,971,942 A * | 7/1976 | Seidman et al. | ......... 250/363.02 |
| 3,975,638 A * | 8/1976 | Grunberg et al. | ........... 250/385.1 |
| 3,984,691 A * | 10/1976 | Allemand et al. | ......... 250/385.1 |
| 4,019,057 A * | 4/1977 | Bram | ............................. 250/375 |
| 4,264,816 A * | 4/1981 | Walenta | ......................... 250/374 |
| 5,025,162 A * | 6/1991 | Charpak | ..................... 250/385.2 |
| 5,180,917 A | 1/1993 | Wraight | |
| 5,434,468 A | 7/1995 | Jeavons | |
| 5,596,201 A * | 1/1997 | Charpak | ..................... 250/385.1 |
| 5,731,584 A * | 3/1998 | Beyne et al. | ................... 250/374 |

(Continued)

FOREIGN PATENT DOCUMENTS

| | | |
|---|---|---|
| WO | 2012058440 A1 | 5/2012 |
| WO | 2012067954 A2 | 5/2012 |

OTHER PUBLICATIONS

Andersen, et al., "10B multi-grid proportional gas counters for large area thermal neutron detectors", Nuclear Instruments and Methods in Physics Research A, 2012, pp. 1-6.

(Continued)

*Primary Examiner* — Kiho Kim

(57) ABSTRACT

Apparatus and method for detecting radiation-of-interest, such as neutron radiation, employs a gas chamber, a gas that responds to ionizing particles by producing electrons and ions, a cathode that attracts ions, and a supporting layer with a conductive pathway. The conductive pathway collects electrons and responds to electrons that drift towards the conductive pathway by inducing production of further electrons and ions within the gas. The electrons that are collected at the conductive pathway and/or the ions that drift away from the conductive pathway will induce an electrical signal, which can be used to detect the radiation-of-interest.

30 Claims, 18 Drawing Sheets

(56) References Cited

U.S. PATENT DOCUMENTS

| | | | |
|---|---|---|---|
| 5,742,061 A * | 4/1998 | Lemonnier et al. | 250/385.1 |
| 6,011,265 A * | 1/2000 | Sauli | 250/374 |
| 6,121,622 A * | 9/2000 | Beyne et al. | 250/374 |
| 6,133,575 A * | 10/2000 | Charpak et al. | 250/385.1 |
| 6,426,504 B1 * | 7/2002 | Menlove et al. | 250/390.01 |
| 7,002,159 B2 | 2/2006 | Lacy | |
| 7,078,705 B1 | 7/2006 | Ianakieve et al. | |
| 7,157,718 B2 | 1/2007 | Gianchandani et al. | |
| 7,332,726 B2 | 2/2008 | Friedman et al. | |
| 7,635,849 B2 | 12/2009 | Klein et al. | |
| 7,683,340 B2 | 3/2010 | Friedman | |
| 7,696,485 B2 | 4/2010 | Friedman et al. | |
| 7,982,191 B2 | 7/2011 | Friedman et al. | |
| 8,022,369 B2 | 9/2011 | Orava et al. | |
| 8,039,792 B2 | 10/2011 | Nikitin et al. | |
| 8,319,175 B2 * | 11/2012 | Zhou et al. | 250/265 |
| 8,389,946 B2 | 3/2013 | Friedman et al. | |
| 8,519,350 B2 * | 8/2013 | McGregor et al. | 250/390.01 |
| 8,669,533 B2 * | 3/2014 | Bashkirov et al. | 250/385.1 |
| 2004/0021088 A1 * | 2/2004 | Thers et al. | 250/385.1 |
| 2006/0138340 A1 | 6/2006 | Ianakiev et al. | |
| 2008/0159476 A1 | 7/2008 | Koltick et al. | |
| 2011/0272570 A1 | 11/2011 | Xu et al. | |
| 2012/0267519 A1 | 10/2012 | Nikitin et al. | |
| 2013/0067741 A1 | 3/2013 | Stephan et al. | |
| 2013/0068941 A1 | 3/2013 | Nikitin | |
| 2013/0068957 A1 | 3/2013 | Stephan et al. | |

OTHER PUBLICATIONS

Becker, et al., "The MIT-LNS gas Detectors R&D Group", http://cyclo.mit.edu/drift/www/, 2011, 10 pages.

Charpak, et al., "The Use of Multiwire Proportional Counters to Select and Localize Charged Particles", Nuclear Instruments and Methods, vol. 62, 1968, pp. 262-268.

Sauli, "Principles of Operation of Multiwire Proportional and Drift Chambers", CERN 77-09—European Organization for Nuclear Research, May 3, 1977, 96 pages.

Sauli, et al., "The Gas Detectors Development Group at CERN", Geneva, Switzerland, Retrieved from http://gdd.web.cern.ch/GDD, Retrieved on Oct. 3, 2014, 2 pages.

Toki, "Review of Straw Chambers", SLAC-PUB-5232—Invited paper to the 5th International Conference on Instrumentation for Colliding Beam Physics, Institute of Nuclear Physics, Novosibirsk, Russia, Mar. 1990, pp. 1-16.

Zhou, et al., "Performance of a compact detector package for the out-of-plane spectrometer system", Nucl. Instr. and Methods A, vol. 487 (3), Jul. 21, 2002, p. 365-380.

\* cited by examiner

APPARATUS AND METHOD FOR DETECTING RADIATION

TECHNICAL FIELD

This disclosure relates to radiation detectors, and more particularly to radiation detectors that employ gas ionization.

BACKGROUND

Radiation detectors that employ gas ionization can be used to detect various types of radiation, such as neutron radiation, beta particle radiation, gamma particle radiation, or X-ray radiation. A gas ionization radiation detector includes a gas chamber filled with a fill gas such as helium-3. The gas chamber also includes a thin wire that acts as an anode. The wire is suspended within a tube that acts as a cathode. The tube and the thin wire create an electric field within the gas chamber. The gas ionization radiation detector relies on the principle that a charged particle that travels through the gas will interact with the fill gas and produce ions and electrons (e.g., ionization). The electrons will drift towards the thin wire and generate avalanches that produce further electrons and ions. These electrons and ions can be detected at the wire. In this manner, the gas ionization radiation detector detects radiation that travels through the gas chamber.

Helium-3 is a particularly efficient fill gas for detecting neutron radiation due to the large neutron capture cross section of the helium-3 isotope. As a neutron travels through the gas chamber, the neutron interacts with a helium-3 atom to create a proton and a triton. These charged particles ionize other atoms of helium-3 to produce electrons and ions. Such helium-3 gas chamber detectors have been used in downhole oil and gas field applications to detect neutrons for a variety of different measurements, such as formation neutron porosity and formation "hydrogen index" or "sigma" (e.g., with a pulsed neutron source).

Although helium-3 is an efficient gas for detection of neutrons, helium-3 gas is becoming more expensive and less available due to scarcity and increased demand. Conventional alternative technologies, such as tubes lined with boron or gas chambers filled with boron tri-fluoride, fail to match the efficiency of helium-3 for neutron detection. The problems with such alternative technologies are compounded in downhole applications, where available space is limited and the environment includes high pressures, high temperatures, substantial mechanical vibrations, and strong mechanical shocks.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a radiation detector for detecting radiation-of-interest, such as neutron radiation. The detector includes a gas chamber that contains a gas. The gas responds to ionizing particles that travel through the gas chamber by producing electrons and ions. In some embodiments, the ionizing particles are the radiation-of-interest (e.g., beta particles). In other embodiments, the ionizing particles are generated from a reaction between a conversion layer and the radiation-of-interest (e.g., neutrons). The gas chamber also includes a cathode and a supporting layer with a conductive pathway. The conductive pathway collects electrons and responds to electrons that drift towards the conductive pathway by inducing production of further electrons and ions within the gas. The electrons that are collected at the conductive pathway and/or the ions that drift away from the conductive pathway will induce an electrical signal, which can be used to detect the radiation.

Illustrative embodiments of the present disclosure also directed to a neutron detector. The neutron detector includes a gas chamber that contains a neutron conversion layer that converts neutrons into ionizing particles and a gas that responds to the ionizing particles by producing electrons and ions. The gas chamber also includes a cathode that attracts ions and a supporting layer with a conductive pathway. The conductive pathway collects electrons and responds to electrons that drift towards the conductive pathway by inducing production of further electrons and ions within the gas. The electrons that are collected at the conductive pathway and/or the ions that drift away from the conductive pathway will induce an electrical signal, which can be used to detect the neutron radiation.

Illustrative embodiments of the present disclosure are also directed to a method for detecting radiation using a radiation detector. The detector includes a gas chamber, a cathode, and a supporting layer with a conductive pathway. The method includes applying an electrical potential between the cathode and the conductive pathway. The conductive pathway induces production of electrons and ions within the gas chamber in response to electrons that drift towards the conductive pathway. The method also includes detecting an electrical signal produced within the conductive pathway.

In various embodiments, the radiation detector includes a cathode with a plurality of recesses. The recesses increase the surface area of the cathode available for coating by the conversion layer and, in some embodiments, increase the efficiency of the detector.

BRIEF DESCRIPTION OF THE DRAWINGS

Those skilled in the art should more fully appreciate advantages of various embodiments of the disclosure from the following "Description of Illustrative Embodiments," discussed with reference to the drawings summarized immediately below.

DESCRIPTION OF ILLUSTRATIVE EMBODIMENTS

Illustrative embodiments of the present disclosure are directed to a radiation detector for detecting radiation-of-interest, such as neutron radiation. The detector includes a gas chamber that contains a fill gas. The fill gas produces electrons and ions in response to ionizing charged particles that travel through the gas chamber. In some embodiments, the ionizing charged particles are the radiation-of-interest (e.g., beta particles). In other embodiments, the ionizing charged particles are generated from a reaction between a conversion layer and the radiation-of-interest (e.g., neutron radiation). The gas chamber also includes a cathode and a supporting layer with a conductive pathway that forms an anode. The conductive pathway collects electrons and induces production of further electrons and ions within the fill gas in response to electrons that drift towards the conductive pathway. The electrons that are collected at the conductive pathway and/or the ions that drift away from the conductive pathway will induce an electrical signal (e.g., an electrical pulse) within the conductive pathway, which can be used to detect the radiation. In various embodiments, the supporting layer and conductive pathway provide for a compact detector design and improved detection efficiency. Details of various embodiments are discussed below.

Figure 1:
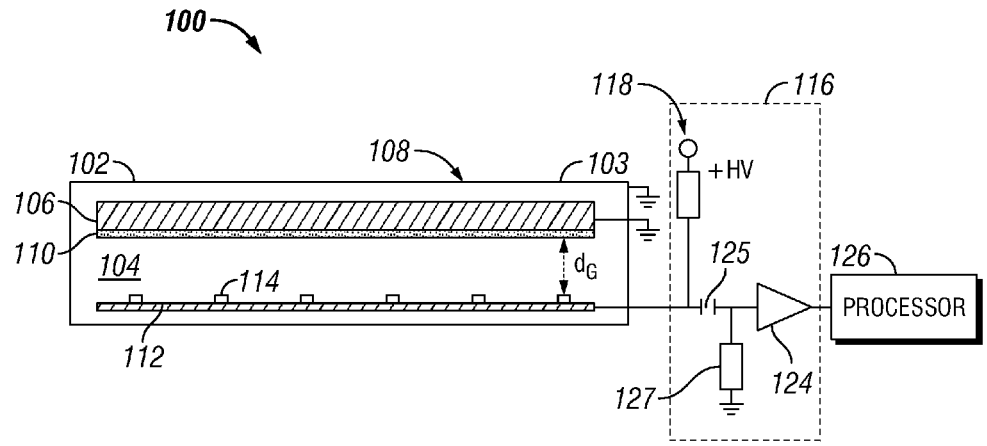
FIG. 1 shows a radiation detector in accordance with one embodiment of the present disclosure.

FIG. 1 shows a radiation detector 100 in accordance with one embodiment of the present disclosure. The radiation detector includes a gas chamber 102. The gas chamber 102 includes a housing 103 that defines an interior volume 104 and seals the interior volume from an exterior environment 108. The housing 103 can be a pressure vessel that provides a differential pressure between the interior volume 104 and the exterior environment 108 of the housing. To this end, in some embodiments, the housing 103 is hermetically sealed. The housing 103 can be made of metals with low neutron capture cross section, such as aluminum, copper, zirconium, iron, steel, and/or stainless steel. The housing 103 may have various different sizes and geometries that depend on a given application for the radiation detector 100. In some embodiments, the interior volume of the housing 103 is between 1 cubic millimeter and 1 cubic meter. A fill gas is disposed within the interior volume 104. The fill gas ionizes (e.g., produces electrons and ions) in response to ionizing particles (e.g., charged particles such as alphas, betas, protons, and tritons) that travel through the gas chamber 102. In some embodiments, to increase the likely hood of interaction with a charged particle (e.g., detection efficiency), the fill gas is a gas with a high atomic Z-number. For example, the fill gas can include helium-3, helium-4, boron tri-fluoride, argon, and/or xenon. The fill gas can also include a mixture of such gases. In various embodiments, due to the cost of helium-3 and helium-4, helium-3 and helium-4 are replaced with boron tri-fluoride, argon, and/or xenon. For example, a mixture of 50% helium-3 and 50% argon would reduce costs by nearly half (e.g., half the extra-cost of helium-3). Additionally or alternatively, to increase the likelihood of interaction with charged particles, the gas may have a pressure greater than atmospheric pressure. In some embodiments, the gas has a pressure between 100 Torr and 15200 Torr (e.g., 20 Bar).

The gas chamber 102 also includes a cathode 106 for attracting ions. In the embodiment, shown in FIG. 1, the cathode 106 is a plate that includes a conductive material. In this case, the cathode is a separate component from the housing 103. In various other embodiments, the cathode 106 may be a part of the housing 103. The selection of the material type and thickness for the cathode may depend on several factors. For example, one factor may include the ability of the cathode to sustain shocks and vibrations (e.g., mechanical rigidity and/or mechanical strength of the cathode). Another factor may be the selection of a low neutron capture cross section for the cathode so that neutrons travel through the cathode and interact with the fill gas or a conversion layer 110 (discussed in further detail below). A high neutron capture cross section may stop neutrons and prevent neutrons from interacting with the fill gas or the conversion layer 110. Thus, a high neutron capture cross section may reduce the efficiency of the detector. Yet another factor may be the type of conversion layer 110 that is selected to coat the cathode. For example, matching thermal expansion coefficients between the cathode and the conversion layer and/or selecting strong adhesivity between the cathode and the conversion layer may improve the effectiveness and robustness of the detector. In various embodiments, the thickness of the cathode is between 50 µm and 1 mm and the cathode is formed from a conductive material, such as copper, aluminum, zirconium, or any other suitable conductive metal. It should be noted that discussion of the material types, relative thicknesses, dimensions, and sizes throughout this disclosure is illustrative and not intended to limit the scope of the disclosure.

A conversion layer 110 is disposed on the cathode 106. The conversion layer 110 converts neutron radiation into ionizing particles (e.g., charged particles such as alphas, betas, protons, and tritons). For example, as a neutron travels through the conversion layer 110, the neutron interacts with the conversion layer and a secondary charged particle is generated that then travels through the gas chamber 102. The conversion layer 110 can include an isotope of boron (e.g., boron-10), an isotope of lithium (e.g., lithium-6), and/or an isotope of gadolinium (e.g., gadolinium-157). Table 1 below shows various materials that can be used for the conversion layer 110, along with a corresponding neutron reaction, a Q value, a cross section, and a coating thickness range for each material. Helium-3 is included in the Table as a basis for comparison.

TABLE 1

| Reaction | Q Value [MeV] | Cross Section at Room Temperature [barn] | Coating Thickness [µm] |
|---|---|---|---|
| $^3$He + n → $^3$H + $^1$H | 0.764 | 5330 | |
| $^{10}$B + n → $^7$Li(*) + $^4$He | 2.792 (or 2.310) | 3838 | 0.5-5 |
| $^6$Li + n → $^3$H + $^4$He | 4.78 | 941 | 5-20 |
| $^{157}$Gd + n → γ + β + ... | β with 29-181 keV | 225000 (49000 for natural Gd) | 10-40 |

In Table 1, the asterisk (e.g., *) denotes the alternative excited state of a $^7$Li nucleus. The alternative excited state has a 94% probability and results in 2.31 MeV of total available energy (Q Value), while the ground states has a 4% probability and results in 2.792 MeV of total available energy.

In illustrative embodiments, the conversion layer 110 includes various chemical components and combination of chemical components. For example, enriched boron nitride ($^{10}$BN), enriched boron carbide ($^{10}$B$_4$C) and/or enriched lithium fluoride ($^6$LiF) can be used to form the conversion layer. In one specific example, a boron carbide disk is used as a sputtering target to coat the cathode 106. A boron carbide layer deposited onto a metal cathode (e.g., aluminum, copper, and/or zirconium) produces an effective and robust design.

In various embodiments, the thickness of the conversion layer 110 is selected to optimize the efficiency of the detector. For example, if the conversion layer is too thick, then the conversion layer will prevent secondary charged particles from interacting with the fill gas. In such cases, the secondary charged particles will be stopped within the conversion layer or the conversion layer will dampen the energy of the secondary charged particles so that the ability of the particles to interact with the fill gas is diminished. On the other hand, if the conversion layer is too thin, then the conversion layer will not efficiently convert many neutrons into secondary charged particles. In either case, the efficiency of the detector is reduced. In a specific example, the conversion layer includes an isotope of boron ($^{10}$B). When a neutron is captured within the conversion layer, a secondary charged particle is released. In this case, an ion of an isotope of lithium ($^7$Li) and an ion of an isotope of helium ($^4$He) are produced. One of the isotope ions (e.g., secondary charged particle) travels within the conversion layer towards the fill gas. To enter the fill gas, the isotope passes through a distance of the conversion layer, which results in an energy loss. On average, as the thickness of the conversion layer increases, so does the distance traveled and the energy lost by the ion. As explained above, however, if the $^{10}$B conversion layer is too thin, then the conversion layer will not efficiently convert many neutrons into secondary charged particles (e.g., $^7$Li and $^4$He), which also reduces the efficiency of the detector. Given these factors, in an illustrative embodiment, the thickness of a $^{10}$B conversion layer is between 0.5 µm and 5 µm to efficiently convert radiation into secondary charged particles.

The cathode 116 and the conversion layer 110 can be formed from a number of layers. For example, an intermittent layer can be deposed between a cathode layer 116 and the conversion layer 110. In some cases, the intermittent layer may be used to bond the conversion layer 110 to the cathode layer 116. In another illustrative embodiment, the cathode layer 116 and the conversion layer 110 can be a single component or layer made from, for example, gadolinium.

In various embodiments of the radiation detector, the conversion layer 110 is omitted. For example, a beta particle detector and/or a high-energy charged particle detector (e.g., a cosmic ray muon detector) may not incorporate a conversion layer because beta particles and high-energy charged particles are already charged particles.

The radiation detector 100 also includes a supporting layer 112 with a conductive pathway 114. The supporting layer 112 has a thickness and two sides that are each defined by an area. The supporting layer 112 also includes an insulating material. The thickness of the supporting layer 112 provides structural support for the conductive pathway 114. In various embodiments, the thickness of the supporting layer 112 is between 50 µm and 2 mm and the area of one side of the supporting layer is between 1 mm$^2$ and 1 m$^2$. The conductive pathway 114 is disposed on or within at least one side of the supporting layer 112. The conductive pathway 114 is as an anode that collects electrons and also generates avalanches in response to electrons that drift towards the conductive pathway. To this end, the conductive pathway 114 includes a conductive material. The conductive pathway 114 also has a path length and small cross section. In illustrative embodiments, the path length is between of 1 mm and 1 m, and the cross section is between 100 µm$^2$ and 5000 µm$^2$.

Figure 2:
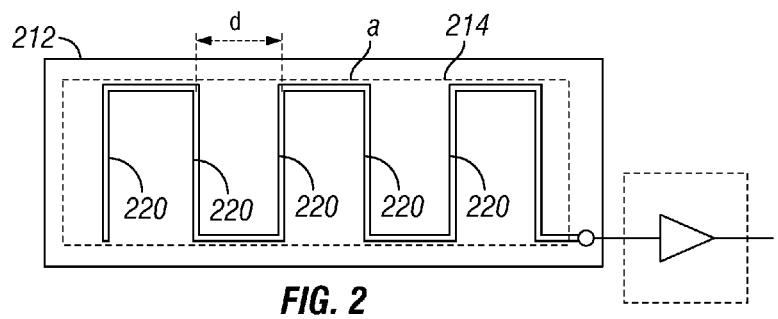
FIG. 2 shows a conductive pathway and a supporting layer in accordance with one embodiment of the present disclosure.
Figure 3:
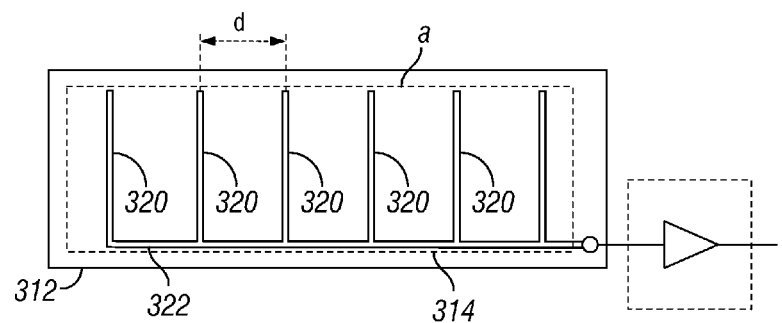
FIG. 3 shows a conductive pathway and a supporting layer in accordance with another embodiment of the present disclosure.

In various embodiments, the conductive pathway 114 forms a pattern on the supporting layer 112. The pattern may include a plurality of different sections that are electrically coupled together. The sections of the pattern may be parallel, perpendicular, or angularly offset from each other. Each of the sections can have a straight path length or a curved path length. FIG. 2 shows a conductive pathway 214 and a supporting layer 212 in accordance with one embodiment of the present disclosure. The conductive pathway 214 forms a serpentine pattern with a plurality of parallel sections 220. FIG. 3 shows a conductive pathway 314 and a supporting layer 312 in accordance with another embodiment. In this case, the conductive pathway 314 forms a comb-like pattern with a plurality of parallel sections 320 that each extends from a section 322. In an illustrative embodiment, the distance (d) between the parallel sections 220, 320 is between 200 µm and 5 cm. Also, in some embodiments, the area (a) of the pattern (e.g., footprint) is between 1 mm$^2$ and 1 m$^2$. Various embodiments of the conductive pathway are not limited to patterns with a plurality of parallel sections. For example, in other embodiments, the conductive pathway 114 can form a concentric pattern with a circular, rectangular, or triangular form. In another example, the conductive pathway 114 forms a pattern without distinct sections, such as a spiral pattern.

Illustrative embodiments of the radiation detector 100 generate an electric filed between the conductive pathway 114 and the cathode 106. To this end, the radiation detector 100 includes electronics 116 that are electrically coupled to the conductive pathway 114. The electronics 116 include a power source (e.g., power supply) 118 that applies a high voltage to the conductive pathway 114 and generates an electric field between the conductive pathway and the cathode 106. In the embodiment shown in FIG. 1, the cathode 106 and the housing 103 are set to ground while the conductive pathway 114 is set to a positive potential. In various other embodiments, the cathode 106 is also coupled to the power source 118 so that the cathode is set at a negative potential, while the conductive pathway 114 is set to a ground or positive potential. In such configurations, as electrons and ions are generated within the fill gas by charged particles, the ions drift toward the cathode 106, while the electrons drift towards the conductive pathway 114 and are collected by the conductive pathway. The electrons that are collected at the conductive pathway 114 and the ions that drift towards the cathode 106 produce an electrical signal (e.g., electrical pulse) within the conductive pathway. The electrical signal may be a change in charge, a change in current, and/or a change in voltage.

Figure 4:
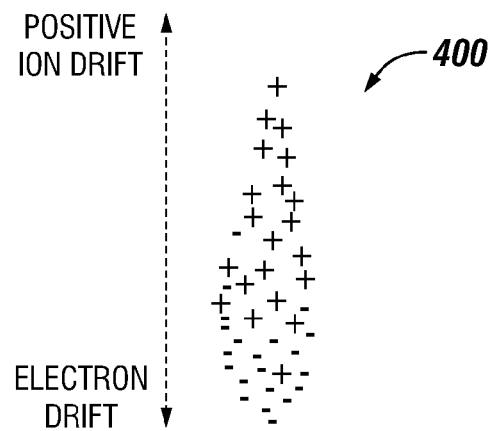
FIG. 4 shows an example of an electron and ion avalanche.

Illustrative embodiments of the radiation detector 100 amplify the electrical signal produced within the conductive pathway 114 to generate a larger detectable and measurable electrical signal. In particular, the radiation detector 100 induces production of further electrons and ions in response to electrons that drift towards the conductive pathway 114. The radiation detector 100 produces further electrons and ions by generating an electron and ion avalanche. FIG. 4 shows an example of an electron and ion avalanche 400. An electron and ion avalanche is a chain reaction where a number of electrons are subjected to strong acceleration by an electric field, and subsequently collide with other particles (e.g., atoms or molecules) of the fill gas and thereby ionize those particles in a process called impact ionization. This reaction releases additional electrons which also collide with further particles to generate more electrons and ions. In this manner, the avalanche amplifies the electrical signal by (1) multiplying the number of electrons that are collected at the conductive pathway 114 and (2) multiplying the number of ions that drift towards the cathode 106. Further details regarding avalanches and generating avalanches can be found in, for example, F. Sauli, "Principles of Operation of Multiwire Proportional and Drift Chambers" CERN 77-09 (May 3, 1997).

Figure 5:
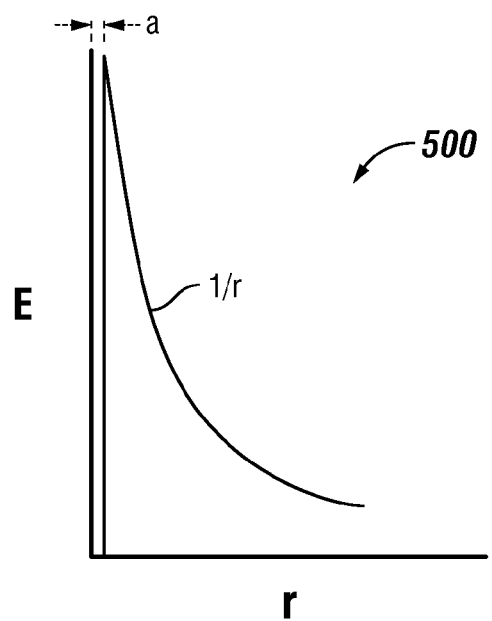
FIG. 5 shows a plot of electric field strength (E) as a function of distance (r) from a conductive pathway with a small cross section (a)

The radiation detector 100 generates avalanches by applying a strong electric field adjacent to the conductive pathway 114. The radiation detector 100 generates a strong electric field by using a conductive pathway with a small cross section. FIG. 5 shows a plot 500 of electric field strength (E) as a function of distance (r) from a conductive pathway 114 with a small cross section (a). The field strength increases exponentially as a function of distance from the conductive pathway 114. In some embodiments, the electric field adjacent the conductive pathway 114 is enhanced by a factor of 5 to 100. In one specific example, the electric field at a 10 µm distance away from a conductive pathway with a rectangular cross section having 50 µm by 17 µm dimensions is enhanced by a factor of 8. In this manner, as electrons drift toward the conductive pathway 114, the strong electric field adjacent the conductive pathway induces an electron and ion avalanche.

In illustrative embodiments, the electrical signal produced at the conductive pathway 114 by the avalanche is further amplified by electronics 116. In the exemplary embodiment of FIG. 1, the electronics 116 include an amplifier 124 that is electrically coupled to the conductive pathway 114 and configured to amplify the electrical signal (e.g., a sudden change in voltage) produced by the electrons collected at the conductive pathway and/or ions that drift away from the conductive pathway. The amplifier is configured to generate an output representative of the electrical signal. The electronics 116 may also include a resistor and a capacitor. In FIG. 1, a capacitor 125 provides an AC coupling between the conductive pathway 114 and the amplifier 124. In this manner, the capacitor 125 isolates the power supply 118 and high voltage from the amplifier 124. A resistor 127 bleeds collected charge from an input of the amplifier 124. In this manner, the resistor 127 "resets" the conductive pathway so that another radiation event can be detected.

As shown in FIG. 1, the output from the electronics 116 is communicated to a processor 126, which interprets the output to detect radiation. In one embodiment, each electrical signal (e.g., each sudden voltage increase) is represented within the output as a pulse in the amplitude of the output. By identifying such pulses within the output signal, the processor 126 detects radiation events. In some embodiments, the processor 126 identifies the electrical signal based upon pulse amplitude. For example, the amplitude of the output is compared to a lower threshold value. The lower threshold value distinguishes electrical signals from smaller noise events within the output, such as thermal noise and radio frequency (RF) noise. The electrical signals with amplitudes that fall above the lower threshold value are representative of radiation events. By counting the electrical signals (e.g., pulses) with such amplitudes, the amount of radiation (e.g., number of radiation events) can be determined. The processor 116 may also include an upper threshold value that distinguishes large noise events, such as a discharge between the cathode and the conductive pathway. This identification process can be performed by a processor using digital signal processing (DSP) techniques, analog signal processing techniques, software techniques, or some combination of techniques.

Figure 6:
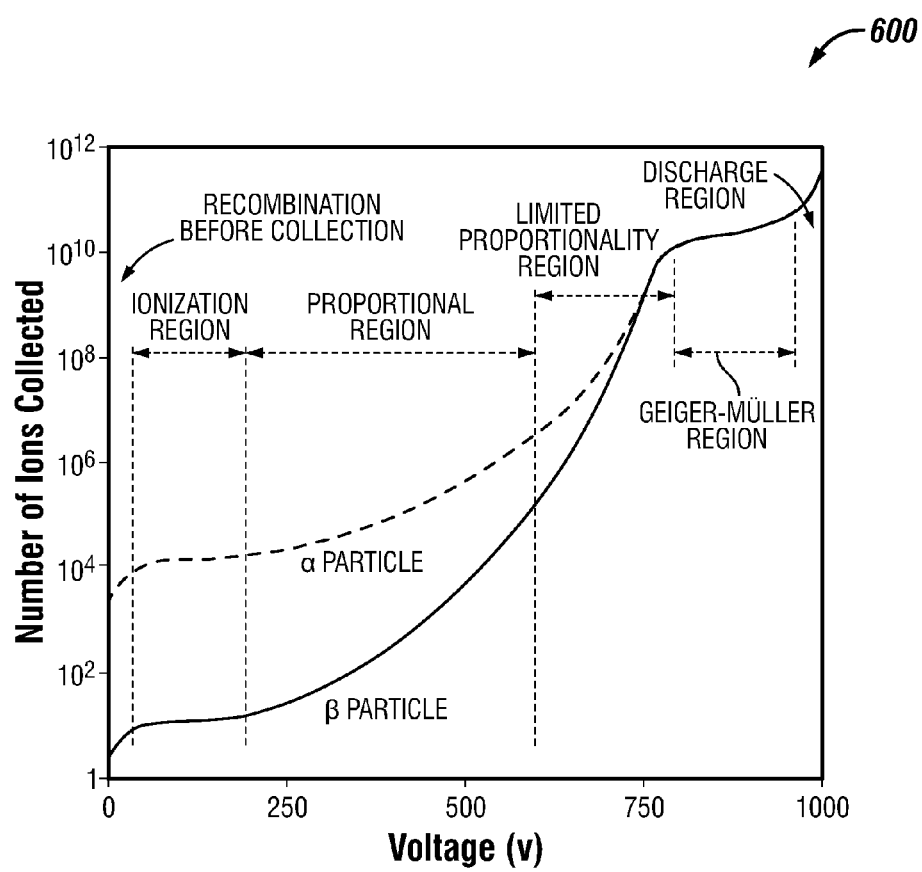
FIG. 6 shows a plot of number of ions collected versus a potential difference between an anode and a cathode for a gas chamber detector.

In illustrative embodiments, the radiation detector 100 may use a variety of different electric field strengths to generate avalanches and amplify the electrical signal within the conductive pathway 114. FIG. 6 shows several operating regions for a gas chamber detector. In particular, FIG. 6 shows a plot 600 of (1) number of ions collected versus (2) potential difference between an anode and a cathode. At the y-axis, the numbers of ions and electrons collected are equal due to charge conservation. The plot 600 includes an alpha particle curve and beta particle curve. In illustrative embodiments of the radiation detector 100, the strength of the electric field is selected so that the conductive pathway 114 induces production of further electrons and ions in response to electrons that drift towards the conductive pathway. To this end, the electric field strength is selected to operate in at least one of an ionization region, a proportional region, a limited proportionality region, and/or a Geiger-Muller region. In one specific embodiment, the radiation detector 100 advantageously operates in a proportional region. In many instances, the proportional region provides for output signals with large amplitudes. Large amplitudes facilitate read-out and detection of electrical signals. Also, the amplitudes are "proportional" to the energy losses of the charged particles traveling through the fill gas. This proportionality can help identify the type of radiation that is being detected. For example, this phenomenon is shown by the difference between the alpha particle curve and the beta particle curve within the proportional region of FIG. 6. In further illustrative embodiments, the electric field strength is selected so that the detector 100 operates below a discharge region. Operating below a discharge region advantageously prevents sparks or discharges between the conductive pathway 114 and the cathode 106, which limits damage to the components of the radiation detector 100 (e.g., the conductive pathway and the cathode) and may increase the lifetime of the detector. In some embodiments, if discharges are observed within the detector 100, the voltage potential applied to the conductive pathway 114 may be reduced to prevent discharges during operation of the detector.

The strength of the electric field between the cathode and the conductive pathway (e.g., electric field gradient) can be modulated by adjusting (1) the voltage difference applied between the cathode and the conductive pathway and/or (2) the gap distance ($d_G$) between the cathode and the conductive pathway. As shown in FIG. 1, in one embodiment, the gap distance ($d_G$) is between 0.2 mm and 5 cm and the voltage difference applied between the cathode 106 and the conductive pathway 114 is between 100 V and 10 kV. Using such parameters, the resulting electric field strength may be between 0.1kV/cm to 5 kV/cm.

In some embodiments, the radiation detector also includes a quenching gas. Apart from a given RC time constant formed by the gas chamber 102 and the electronics 116, each electrical signal will have a particular amplitude and duration, which also depends on, for example, (1) the fill gases within the gas chamber 102 and (2) the strength of the electrical field. In some cases, the processor 126 may not be able to distinguish between each radiation event because the electrical signals have (1) saturated large amplitudes, (2) long durations, and/or (3) there are many radiation events in a small time period. To facilitate detection of the radiation events in a controlled manner, the gas chamber 102 may include a quenching gas. In various embodiments, the quenching gas is a polyatomic quenching gas such as methane ($CH_4$), carbon dioxide ($CO_2$), and/or iso-butane. In various embodiments, the amount of the quenching gas can vary between 1% to 50%. In one specific example, the gas chamber includes 90% argon and 10% methane. In another specific example, the gas chamber includes 95% argon and 5% carbon dioxide. The quenching gas prevents avalanches from continuing for long durations. In this manner, the quenching gas helps decrease the duration of each electrical signal and facilitates detection of each radiation event in a controlled manner.

As explained above, a radiation event within the gas chamber will generate a detectable and measurable electrical signal that is communicated to the processor. In one specific example, a neutron travels into a conversion layer 110 that includes an isotope of boron. The conversion layer 110 interacts with the neutron to release a charged alpha particle (e.g., $^4He^+$). The charged alpha particle travels through the fill gas (e.g., argon) and ionizes the fill gas to form electrons (−) and ions (e.g., $Ar^+$). The charged particle will continue to travel along its trajectory and produce electrons and ions until the particle falls below an ionization threshold energy. The resulting electrons drift towards a portion of the conductive pathway 114 and produce an avalanche. The electrons and ions from this avalanche produce an electrical signal (e.g., a sudden voltage increase) within the conductive pathway, which, in turn, is amplified by the electronics 116 and output to the processor 126. Each neutron will result in an electrical signal within the conductive pathway 114. By counting each electrical signal within the output, the processor 126 can determine the amount of neutron radiation (e.g., number of radiation events).

Figure 7A:
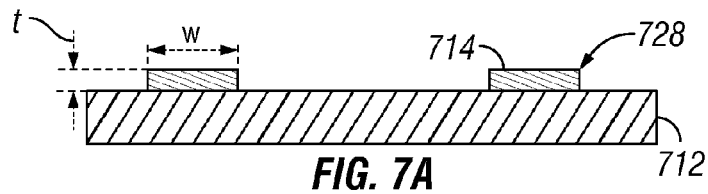
FIG. 7A shows a conductive pathway with a rectangular cross section in accordance with one embodiment of the present disclosure.
Figure 7B:
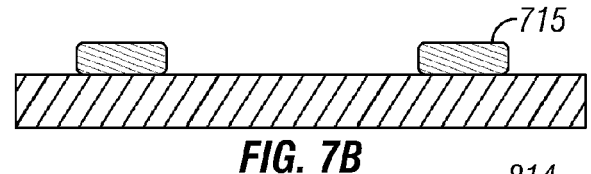
FIG. 7B shows a conductive pathway with a rectangular cross section in accordance with another embodiment of the present disclosure.

As shown in FIGS. 7A through 14, the conductive pathway can have a variety of different geometries and configurations. For example, FIG. 7A shows a conductive pathway 714 with a rectangular cross section that is disposed on a supporting layer 712. The cross section has a width (w) and a thickness (t). In some embodiments, the width of the conductive pathway 714 is between 10 μm and 100 μm and the thickness is between 10 μm and 50 μm. In another example, FIG. 7B shows a rectangular conductive pathway 715 with rounded corners.

Figure 8A:
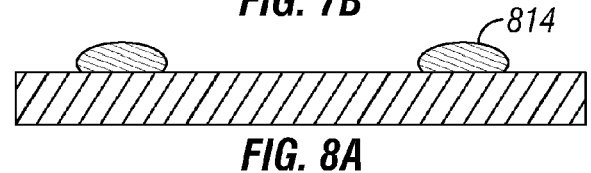
FIG. 8A shows a conductive pathway with an elliptical cross section in accordance with one embodiment of the present disclosure.
Figure 8B:
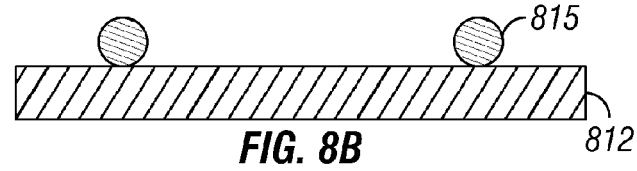
FIG. 8B shows a conductive pathway with a circular cross section in accordance with another embodiment of the present disclosure.
Figure 9:
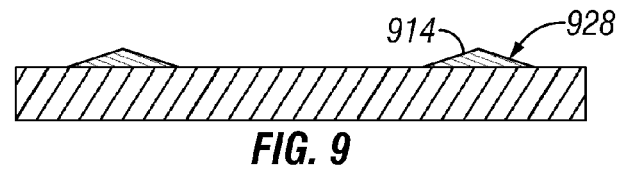
FIG. 9 shows a conductive pathway with a triangular cross section in accordance with one embodiment of the present disclosure.
Figure 10:
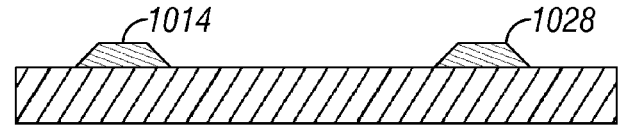
FIG. 10 shows a conductive pathway with a trapezoidal cross section in accordance with one embodiment of the present disclosure.

Embodiments of the conductive pathway are not limited to rectangular cross sections. For example, FIG. 8A shows a conductive pathway 814 with an elliptical cross section and FIG. 8B shows a conductive pathway 815 with a circular cross section. In yet other examples, FIG. 9 shows a conductive pathway 914 with a triangular cross section and FIG. 10 shows a conductive pathway 1014 with a trapezoidal cross section.

Figure 11A:
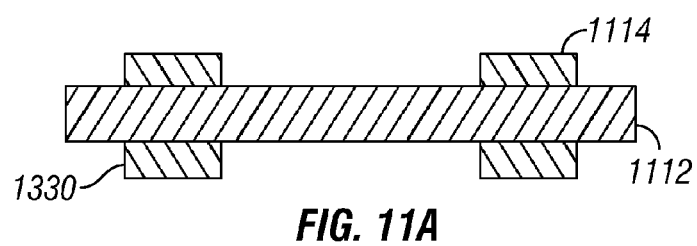
FIG. 11A shows a first conductive pathway disposed on one side of a supporting layer with a second conductive pathway is disposed on another side of the supporting layer in accordance with one embodiment of the present disclosure.
Figure 11B:
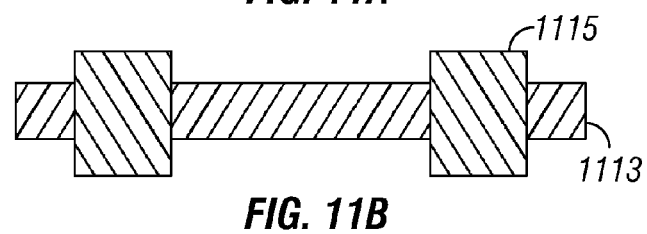
FIG. 11B shows a conductive pathway that extends through the supporting layer in accordance with one embodiment of the present disclosure.

In additional or alternative embodiments, the conductive pathway is disposed on both sides of the supporting layer. For example, FIG. 11A shows a first conductive pathway 1114 disposed on one side of the supporting layer with a second conductive pathway 1130 disposed on another side of the supporting layer. In FIG. 11A, the first conductive pathway 1114 and the second conductive pathway 1130 are separated by the supporting layer. In another embodiment, the conductive pathway 114 extends through the supporting layer 112. FIG. 11B shows a conductive pathway 1115 that extends through the supporting layer 1113 and is exposed on each side of the supporting layer. In yet another embodiment (not shown), portions of the conductive pathway alternate between sides of the supporting layer (e.g., the conductive pathway forms a "stitched" pattern within the supporting layer).

In illustrative embodiments of the present disclosure, the conductive pathway includes a cross section that is substantially uniform along a length of the conductive pathway. More specifically, in such embodiments, the conductive pathway does not include discontinuous features (e.g., ribs or protrusions) along the length of the pathway. A uniform cross section generates an electric field that promotes production of a consistent number of electrons and ions within avalanches along the length of the conductive pathway. Also, the conductive pathway both generates avalanches and conducts electrical signals along its length.

The supporting layer and the conductive pathway can be fabricated using a variety of different materials and techniques. For example, in various embodiments, the supporting layer 112 is a rigid or flexible printed circuit board (PCB) and the conductive pathway 114 is a trace on the PCB. The trace is made from a conductive material, such as copper or aluminum, and the PCB board is made from a laminate material or a polyimide film. In one specific embodiment, the PCB board is made from a number of polyimide film layers with thicknesses between 50 µm and 200 µm. In some embodiment, the PCB has a total thickness between 50 µm and 2 mm. The conductive pathway 114 is formed by chemically removing (e.g., etching) a conductive coating layer that is disposed on the PCB. Portions of the conductive coating layer are removed from the PCB to define the conductive pathway 114. In other embodiments, the trace is deposited onto the PCB using an electroplating process.

Figure 12:
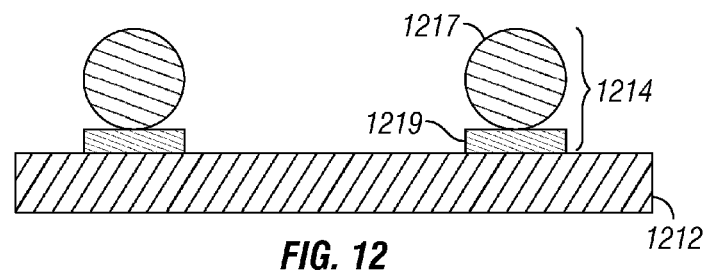
FIG. 12 shows a supporting layer with a conductive pathway that includes a wire bonded onto a trace in accordance with one embodiment of the present disclosure.

In further illustrative embodiments, the supporting layer 112 is an insulating material, such as a ceramic material or a resistive semiconductor material (e.g., silicon oxide). The conductive pathway 114 is deposited onto the supporting layer 112 using a metallization process and/or a photolithographic process. In another example, the conductive pathway 114 is a wire made from a conductive material that is bonded onto the insulating material. FIG. 8B shows an example of a wire 815 bonded onto a supporting layer 812 (e.g., using an adhesive agent). In yet another example, the wire is bonded onto thin traces that are disposed on the supporting layer (e.g., traces on a PCB). FIG. 12 shows a supporting layer with a conductive pathway 1214 that includes a wire 1217 bonded onto a trace 1219. The wire 1217 can be bonded onto the trace 1219 by fusing the elements at high temperatures and/or by using an adhesive agent.

Figure 13:
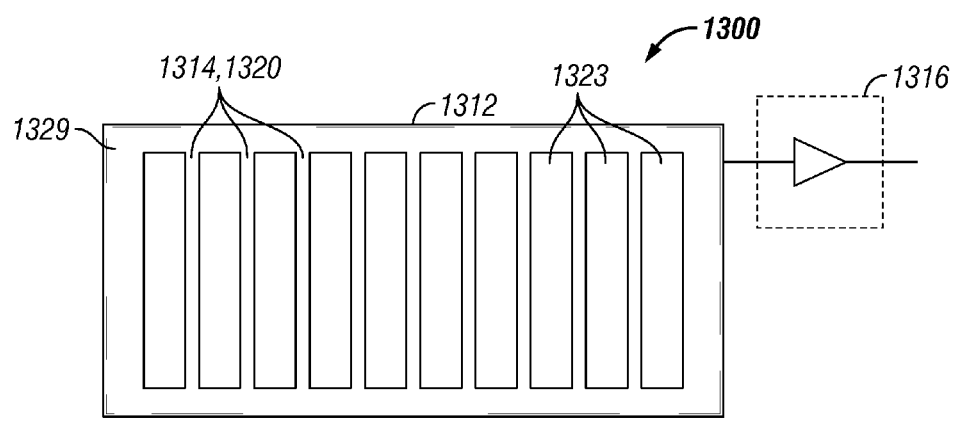
FIG. 13 shows a single component that includes a supporting layer and a conductive pathway in accordance with one embodiment of the present disclosure.
Figure 14:
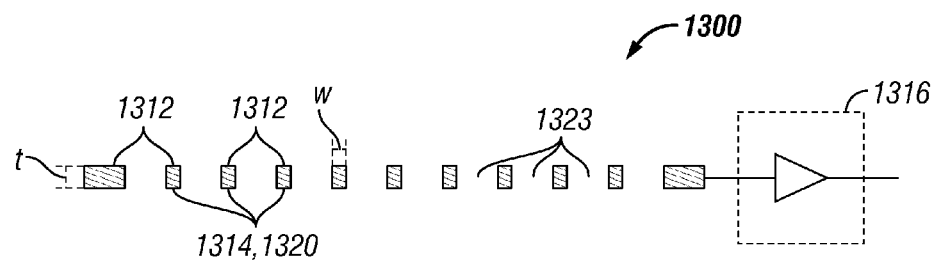
FIG. 14 shows a cross section of the single component.

In illustrative embodiments, the conductive pathway and the supporting layer are a single component. For example, FIG. 13 shows a single component 1300 that includes a supporting layer 1312 and a conductive pathway 1314. FIG. 14 shows a cross section of the single component 1300. In FIGS. 13 and 14, the single component includes a conductive pathway 1314 with a number of sections 1320. Each section 1320 is connected to a surrounding frame 1329 to form a grid (e.g. grill) structure, which is connected to electronics 1316. In one specific example, the conductive pathway 1314 and the supporting layer 112 are formed from a substrate that includes a conductive material, such as a metal material or a conductive semiconductor material (e.g. doped silicon). In such an embodiment, apertures 1323 are formed within the substrate and the remaining portions of the substrate between the apertures 1323 define multiple sections 1320 of the patterned conductive pathway 1314. The apertures 1323 are formed within the conductive material using, for example, a machining process, micro-machining process, or a chemical etching process. In various embodiments, the geometry of these sections 1320 (e.g., thickness (t) and width (w)) is sufficiently small so that the sections generate avalanches. On the other hand, the geometries of these sections 1320 and the frame 1329 are sufficiently large so that the sections and the frame provide structural integrity to the structure.

Illustrative embodiments of the radiation detector operate with improved detection efficiency, while also maintaining a small package size, by increasing the surface area of the conversion layer exposed to radiation (e.g., neutron radiation). By increasing the surface area of the conversion layer exposed to radiation, the detector increases the amount of radiation that is converted into charged particles and detected at the conductive pathway. The surface area of the conversion layer can be increased by increasing a surface area of the cathode available for coating by the conversion layer.

Figure 15:
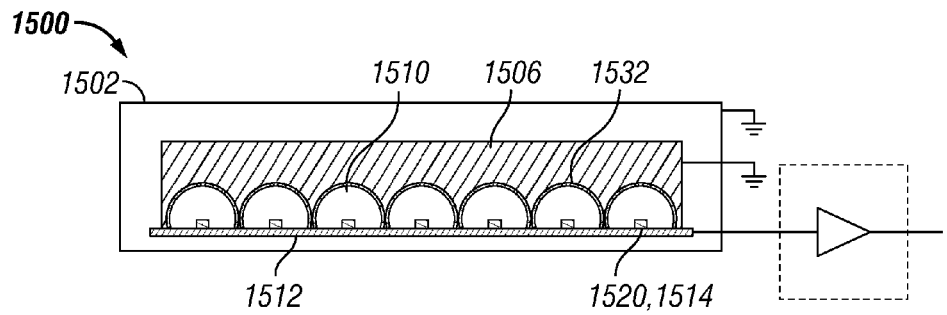
FIG. 15 shows a radiation detector with semi-circular recesses in accordance with one embodiment of the present disclosure.
Figure 16:
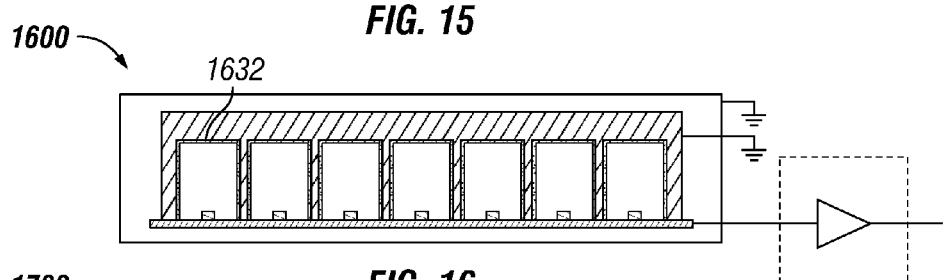
FIG. 16 shows a radiation detector with rectangular recesses in accordance with one embodiment of the present disclosure.
Figure 17:
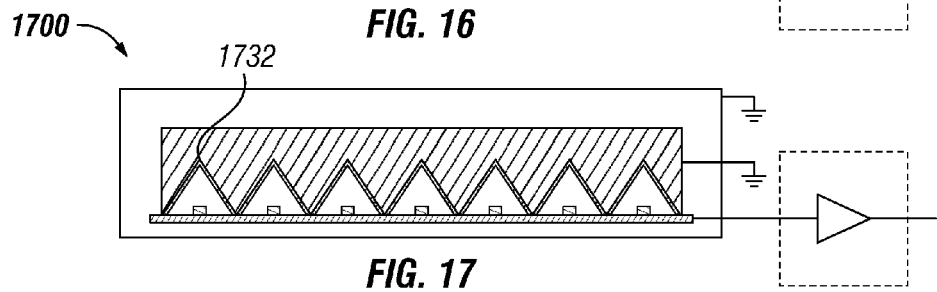
FIG. 17 shows a radiation detector with triangular recesses in accordance with various embodiments of the present disclosure.

In illustrative embodiments, the surface area of the cathode available for coating is increased by creating recesses within the cathode. FIG. 15 shows a radiation detector 1500 in accordance with one embodiment of the present disclosure. The radiation detector 1500 includes a cathode 1506 with a number of parallel recesses 1532 and each parallel recess corresponds to parallel sections 1520 of a conductive pathway 1514. In FIG. 15, each parallel recess 1532 has a semi-circular shape. In some embodiments, the radius of each parallel recess 1532 is between 0.2 mm and 5 cm. By including such recesses 1532 within the cathode 1506, the surface area of the conversion layer 1510 available for coating is increased by a factor of approximately 1.5 (e.g., π/2). The recesses 1532 can have a variety of different shapes (e.g., semi-circular, elliptical, sinusoidal, rectangular, and triangular). FIG. 16 shows a radiation detector 1600 with rectangular recesses 1632 and FIG. 17 shows a radiation detector 1700 with triangular recesses 1732 in accordance with various embodiments of the present disclosure.

In addition to improving detection efficiency by increasing the surface area of the conversion layer, illustrative embodiments of the radiation detector also increase detection efficiency by better controlling movement of electrons and ions within the detector. Each recess within the cathode generates a "shaped" electric field distribution that guides electrons towards the conductive pathway. For example, as shown in FIG. 15, the recesses 1532 at least partially surround each parallel section 1500 of the conductive pathway 1514. Electrons that form between the cathode 1506 and the supporting layer 1512 are partially surrounded by the cathode and are pushed toward the conductive pathway from a number of directions. Similarly, ions that form between the supporting layer 1512 and the cathode 1506 are attracted to the cathode from a number of directions. Such shaped electrical fields improve charge collection of electrons and ions, which, in turn, results in more efficient radiation detection.

Figure 18:
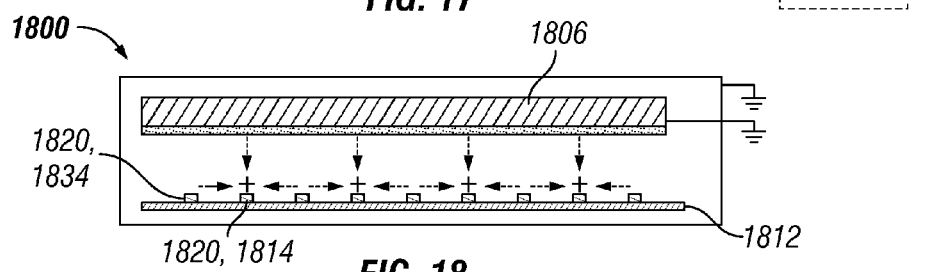
FIG. 18 shows a radiation detector that includes a supporting layer with a first conductive pathway and a second conductive pathway in accordance with one embodiment of the present disclosure.
Figure 19:
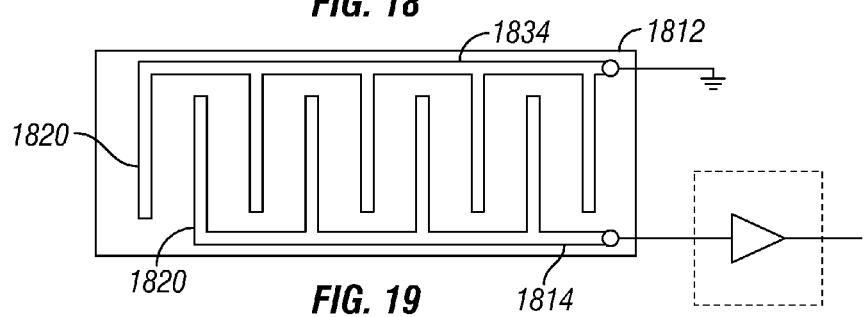
FIG. 19 shows a top-view of the supporting layer shown in FIG. 18.

FIGS. 18 and 19 show another example of a radiation detector 1800 that improves detection efficiency by better controlling movement of electrons and ions within the gas chamber. FIG. 18 shows a cross section of the radiation detector 1800, while FIG. 19 shows a top-view of a supporting layer 1812. The radiation detector 1800 includes a supporting layer 1812 with a first conductive pathway 1814 and a second conductive pathway 1834. Each conductive pathway 1814, 1834 includes a plurality of parallel sections 1820. As shown in FIGS. 18 and 19, the parallel sections 1820 of the first conductive pathway 1814 are disposed between parallel sections 1820 of the second conductive pathway 1834. The first conductive pathway 1814 is set to a positive potential with respect to the cathode 1806 so that the conductive pathway collects electrons and induces avalanches. The second conductive pathway 1834 is set to a similar potential as the cathode 1806, which is set to ground or to a negative potential, as compared to the conductive pathway 1814. The cathode 1806 and the parallel sections 1820 of the second conductive pathway 1834 push electrons towards the parallel sections 1820 of the first conductive pathway 1814, as shown by the arrows in FIG. 18. In this manner, the second conductive pathway 1834 provides for a "shaped" electrical field distribution that guides electrons towards the first conductive pathway 1814.

Figure 20:
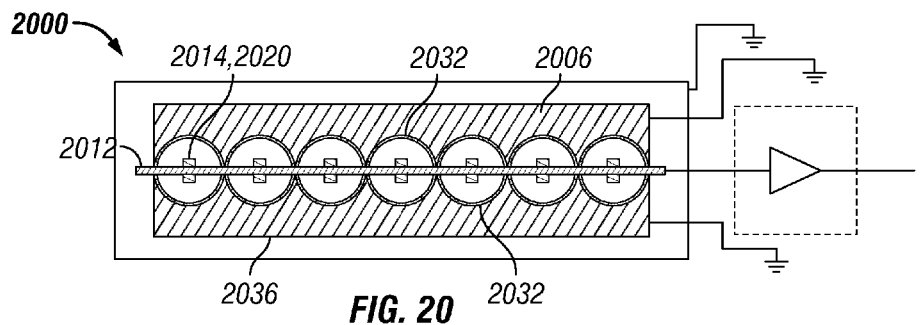
FIG. 20 shows a radiation detector that includes two cathodes in accordance with one embodiment of the present disclosure.

Illustrative embodiments of the radiation detector are not limited to embodiments with a single cathode and a single supporting layer. For example, FIG. 20 shows a radiation detector 2000 that includes two cathodes. The radiation detector 2000 includes a single supporting layer 2012 with a conductive pathway 2014 that is exposed on both a top side and a bottom side of the supporting layer. The conductive pathway 2014 includes a number of parallel sections 2020 as shown in, for example, FIG. 2. A first cathode 2006 includes parallel recesses 2032 that correspond to each of the parallel sections 2020 on the top side of the supporting layer 2012, while a second cathode 2036 includes parallel recesses 2032 that correspond to each of the parallel sections 2020 on the bottom side of the supporting layer 2012.

Figure 21:
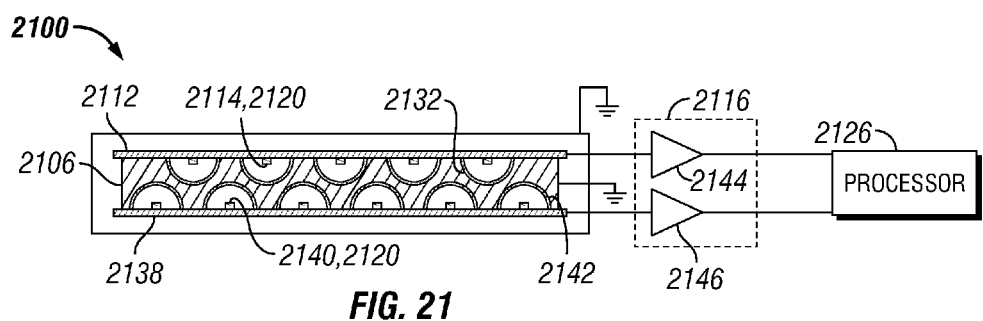
FIG. 21 shows a radiation detector that includes two supporting layers in accordance with one embodiment of the present disclosure.

In another example, FIG. 21 shows a radiation detector 2100 that includes two supporting layers. The radiation detector 2100 includes a cathode 2106 with a top side and a bottom side. Each side of the cathode 2106 includes a series of parallel recesses 2132, 2142. The detector 2100 also includes a top supporting layer 2112 with a top conductive pathway 2114 and a bottom supporting layer 2138 with a bottom conductive pathway 2140. The top conductive pathway 2114 includes parallel sections 2120 that correspond to each of the recesses 2132 on the top side of the cathode 2106. The bottom conductive pathway 2140 includes parallel sections 2140 that correspond to each of the recesses 2142 on the bottom side of the cathode. The arrangement of cathodes and supporting layers, as shown in FIGS. 20 and 21, improves detection efficiency while maintaining a compact configuration.

Figure 22:
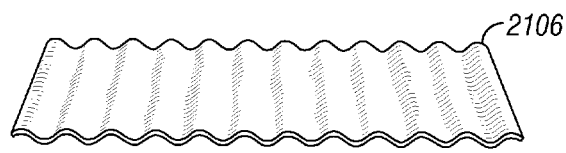
FIG. 22 shows a cathode in accordance with one embodiment of the present disclosure.
Figure 23:
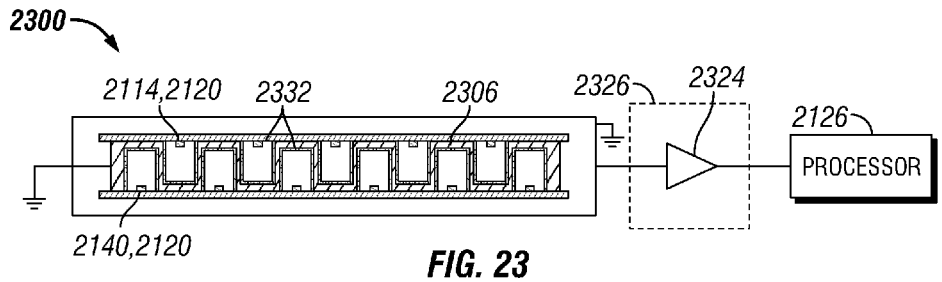
FIG. 23 shows a radiation detector with a cathode that includes rectangular recesses in accordance with one embodiment of the present disclosure.
Figure 24:
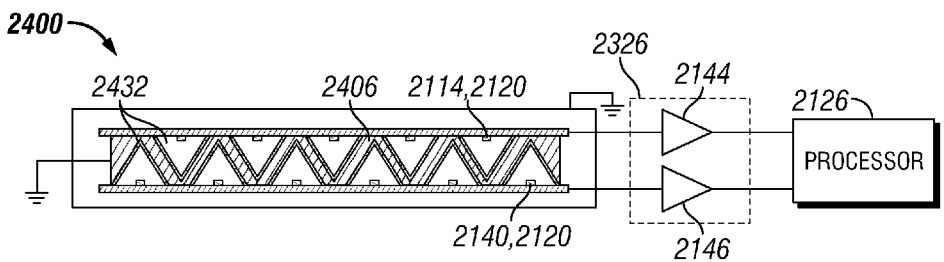
FIG. 24 shows a radiation detector with a cathode that includes triangular recesses in accordance with one embodiment of the present disclosure.
Figure 25:
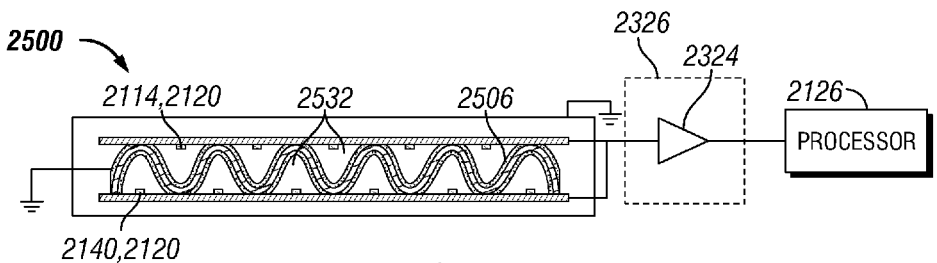
FIG. 25 shows a radiation detector with a cathode that includes sinusoidal recesses in accordance with one embodiment of the present disclosure.

The cathode described herein can be fabricated using a variety of different materials and techniques. In some embodiments, the cathode is machined from a monolithic block of material such as copper, aluminum, or zirconium. In another embodiment, the recesses are etched into the cathode. In yet another embodiment, the cathode can be formed from a sheet of material. FIG. 22 shows a cathode 2106 in accordance with one embodiment of the present disclosure. The cathode 2106 is formed from a sheet of material. More specifically, each semi-circular recess 2132, 2142 is formed by mechanically altering the sheet. A bending or pressing process can be used to alter the sheet. In some embodiments, the sheet has a thickness between 50 μm and 1 mm. A sheet of material can also be used to form recesses with a variety of different shapes. For example, FIG. 23 shows a radiation detector 2300 with a cathode 2306 that includes rectangular recesses 2332. In another example, FIG. 24 shows a radiation detector 2400 with a cathode 2406 that includes triangular recesses 2432. In yet another example, FIG. 25 shows a radiation detector 2500 with a cathode 2506 that includes sinusoidal recesses 2532. In each case, the recesses can be formed by mechanically altering a sheet of material. In some cases, using a sheet of material for the cathode 106 may reduce cost and manufacturing complexity.

The electronics and the conductive pathways can be coupled using a variety of different configurations. For example, in FIGS. 21 and 24, the electronics 2116 include two separate amplifiers 2144, 2146. The top conductive pathway 2114 and the bottom conductive pathway 2140 are connected to separate amplifiers 2144, 2146. Also, the outputs from the separate amplifiers 2144, 2146 are interpreted separately by the processor 2126. In other embodiments, such as the embodiments in FIGS. 23 and 25, the conductive pathways 2114, 2140 are connected to a single amplifier 2324. In such embodiments, a single output is sent to the processor 2126 for interpretation.

Figure 26:
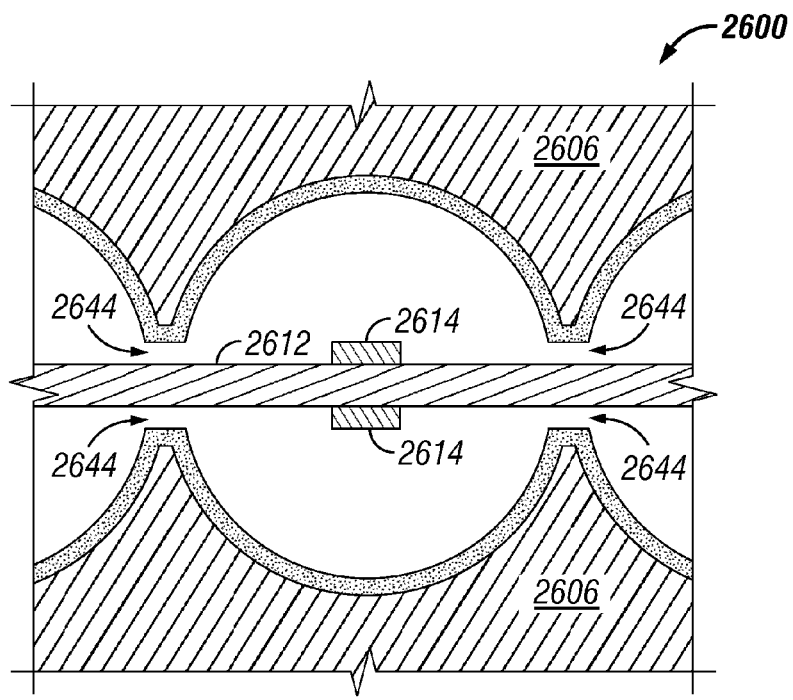
FIG. 26 shows a radiation detector with gaps that prevent electrical discharges in accordance with one embodiment of the present disclosure.

Various embodiments of the radiation detector include features that prevent electrical discharges between the conductive pathway and the cathode. In some cases, such discharges are caused by erratic charge accumulation on surfaces of the supporting layer. The electrical discharges may create artifacts in the output sent to the processor and may also damage the components of the radiation detector (e.g., conductive pathway). Illustrative embodiments of the radiation detector may use any feature or combination of features described in FIGS. 26-29 to prevent electric discharges. For example, FIG. 26 shows a radiation detector 2600 with gaps 2644 that prevent electrical discharges between the conductive pathway 2614 and cathodes 2606. In this embodiment, each cathode 2606 is separated from the supporting layer 2612 by a gap 2644 that prevents an electrical discharge from traveling from the conductive pathway 2614, along the surface of supporting layer 2612, and into the cathode 2606. In some embodiments, the gap has a width of between 20 μm and 200 μm.

Figure 27:
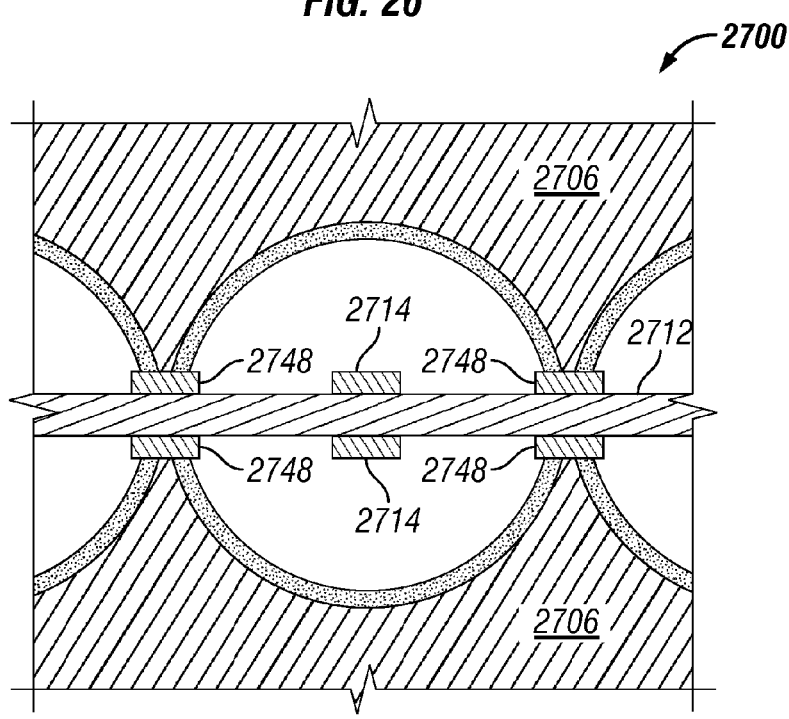
FIG. 27 shows a supporting layer with conductive pads that prevent electrical discharges in accordance with one embodiment of the present disclosure.

In another example, conductive pads can be used to ensure a solid contact that prevents an electrical discharge between the conductive pathway and the cathode. FIG. 27 shows a radiation detector 2700 with conductive pads 2748 that prevent electrical discharges between the conductive pathway 2714 and cathodes 2706. In FIG. 27, instead of directly contacting the supporting layer 2712, the cathode 2706 is in contact with the conductive pads 2748. The conductive pads 2748 can be fabricated in the same manner as the second conductive pathway 1834 previously described in FIGS. 18 and 19. The conductive pads 2748 can be set at a similar electrical potential to the cathode 2706 (e.g., by contacting the cathode and/or through a contact with an external electrical connection).

Figure 28:
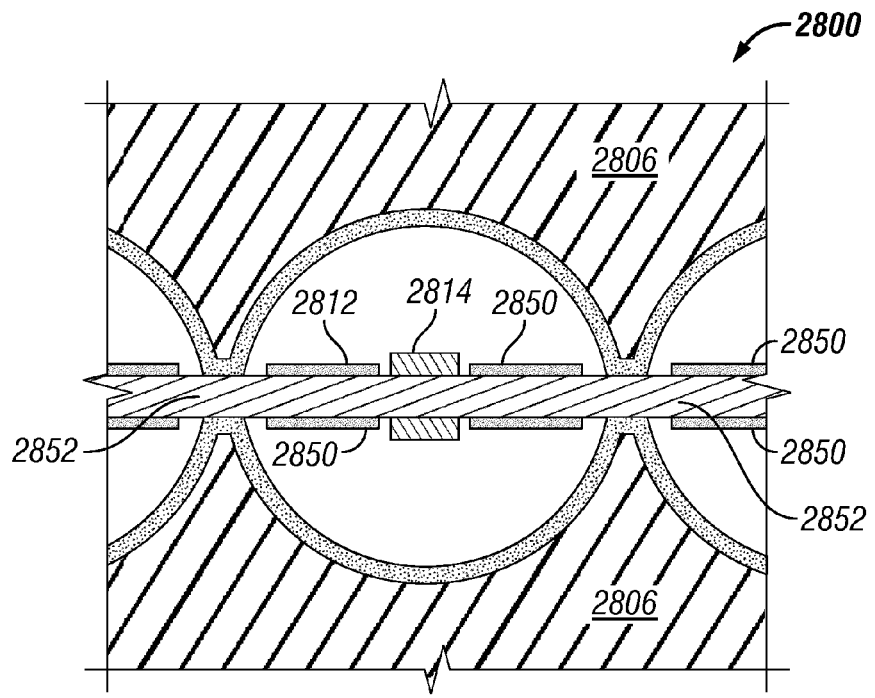
FIG. 28 shows a radiation detector with a resistive material disposed on a supporting layer that prevents electrical discharges in accordance with one embodiment of the present disclosure.

In yet another example, a resistive material can be disposed on the supporting layer to prevent charge accumulation and electrical discharges between the conductive pathway and the cathode. FIG. 28 shows a radiation detector 2800 with a resistive material 2850 disposed on the supporting layer 2812. More specifically, the resistive material 2850 is disposed between (1) the conductive pathway 2814 and (2) a contact point 2852 between the cathode 2806 and the supporting layer 2812. The resistive material 2850 removes erratic charge accumulation and prevents an electrical discharge from travelling along the surface of the supporting layer 2812 to the contact point 2852. The resistive material 2850 can be an insulating material, such as graphite or diamond-like carbon. In various embodiments, the resistive material 2850 can also include an enriched boron or boron carbide material. Such enriched materials contribute to neutron conversion and result in increased detection efficiency, while also preventing electrical discharges.

Figure 29:
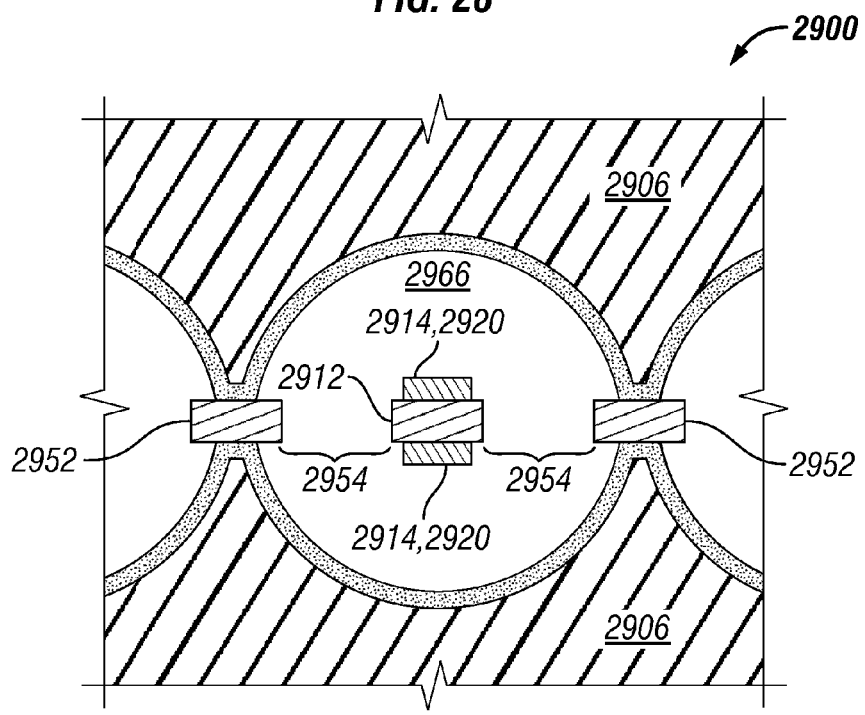
FIG. 29 shows a radiation detector with apertures within the supporting layer that prevent electrical discharges in accordance with one embodiment of the present disclosure.
Figure 30:
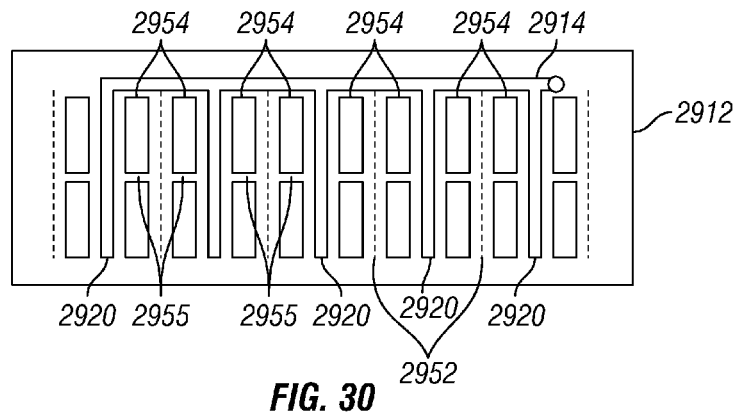
FIG. 30 shows a top-view of the supporting layer shown in FIG. 29.

In a further example, apertures within the supporting layer can be used to prevent electrical discharges between the conductive pathway and the cathode. FIG. 29 shows apertures 2954 formed within the supporting layer 2912 that prevent electrical discharges. The apertures 2954 are formed between (1) the conductive pathway 2914 and (2) contact points 2952 between the cathodes 2906 and the supporting layer 2912. In this manner, the apertures 2954 reduce charge accumulation and also prevent electrical discharges from travelling through the supporting layer to the contact points 2952. FIG. 30 shows a top-view of the supporting layer 2912. In FIG. 30, dashed lines represent the contact points 2952 between the supporting layer 2952 and the cathodes 2906. The apertures 2954 within the supporting layer 2912 are located between each contact point 2952 and each section 2920 of conductive pathway 2914. Some embodiments may also include structural members 2955 to reinforce the supporting layer 2912. In various embodiments, the width of each aperture 2954 is between 100 μm and 2 cm. These dimensions may depend on the nominal dimensions of the recesses within the cathode 2906. In some embodiments, the length of the apertures is between 1 mm to approximately the entire length of the parallel sections 2920. The apertures 2954, as shown in FIG. 29, further enhance detection efficiency by reducing the surface area of the supporting layer within an interior gas volume 2966. By reducing those surface areas, charged particles that travel through the fill gas to produce ions and electrons are less likely to strike the supporting layer and lose energy. Instead, the charged particles continue to travel through the interior gas volume 2966 and produce more electrons and ions. In this manner, reducing the surface area of the supporting layer 2912 enhances detection efficiency. These benefits are compounded with respect to low energy secondary charged particles that are produced from neutron capture reactions.

Contact between the cathode and the supporting layer, as shown in FIGS. 27, 28, and 29, improves the ruggedness of the radiation detector. In particular, by contacting one another, the cathode and supporting layer create a compact configuration that provides further structural integrity. Improved ruggedness is particularly advantageous in borehole environments that may include substantial mechanical vibrations and strong mechanical shocks.

In illustrative embodiments, the supporting layer and the conductive pathway are also electrically isolated from the housing. Portions of the housing may be covered by an insulating material (not shown) to prevent discharges between the housing and internal components of the housing at high electrical potential (e.g., supporting layer and conductive pathway).

Figure 31:
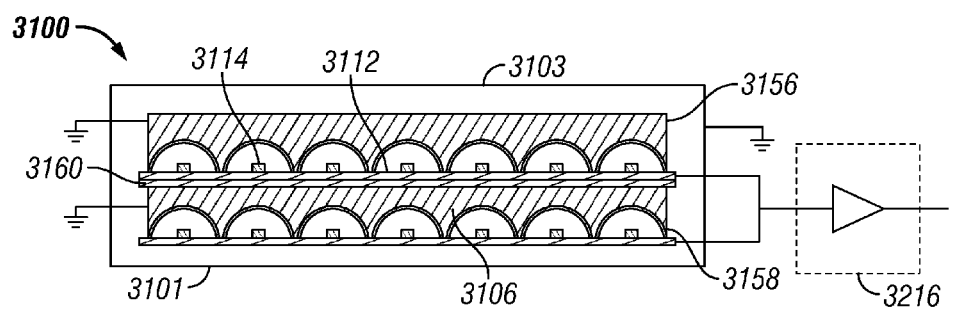
FIG. 31 shows a stacked detector configuration in accordance with one embodiment of the present disclosure.

Illustrative embodiments of the radiation detector include multiple detection modules to increase detection efficiency and maintain small overall package size. A detection module includes a number of supporting layers (e.g., 1, 2, or 5) and a number of cathodes (e.g., 1, 2, or 5). FIGS. 1, 15-18, and 20-25 show examples of radiation detection modules in accordance with various embodiments of the present disclosure. In illustrative embodiments, the modules are arranged in a stacked configuration. A stacked configuration increases efficiency of the detector while also maintaining a compact configuration. Such a stacked configuration is particularly advantageous in increasing efficiency for neutron detection. FIG. 31 shows a stacked detector configuration 3100 in accordance with one embodiment of the present disclosure. In FIG. 31, a first detector module 3156 and a second detector module 3158 are stacked. In this case, each module is similar to the module shown in FIG. 15. The two modules 3156, 3158 are contained within a gas chamber 3102. The supporting layer 3112 of the first module 3156 is adjacent the cathode 3106 of the second module 3158. In some embodiments, an insulating layer 3160 can be disposed between the supporting layer 3112 and the adjacent cathode 3106 to prevent electrical discharges between the supporting layer and the adjacent cathode. The insulating layer may form a small gap or may be made from an insulating material, such as graphite, polyimide film, and/or ceramic.

Figure 32:
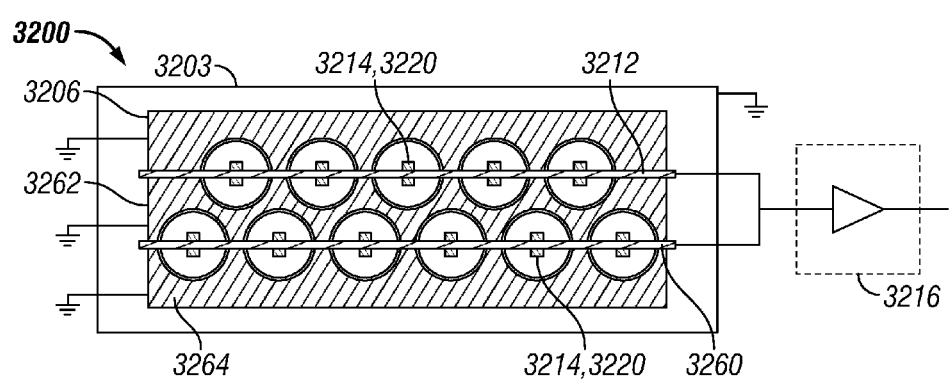
FIG. 32 shows a stacked detector configuration in accordance with another embodiment of the present disclosure.
Figure 33:
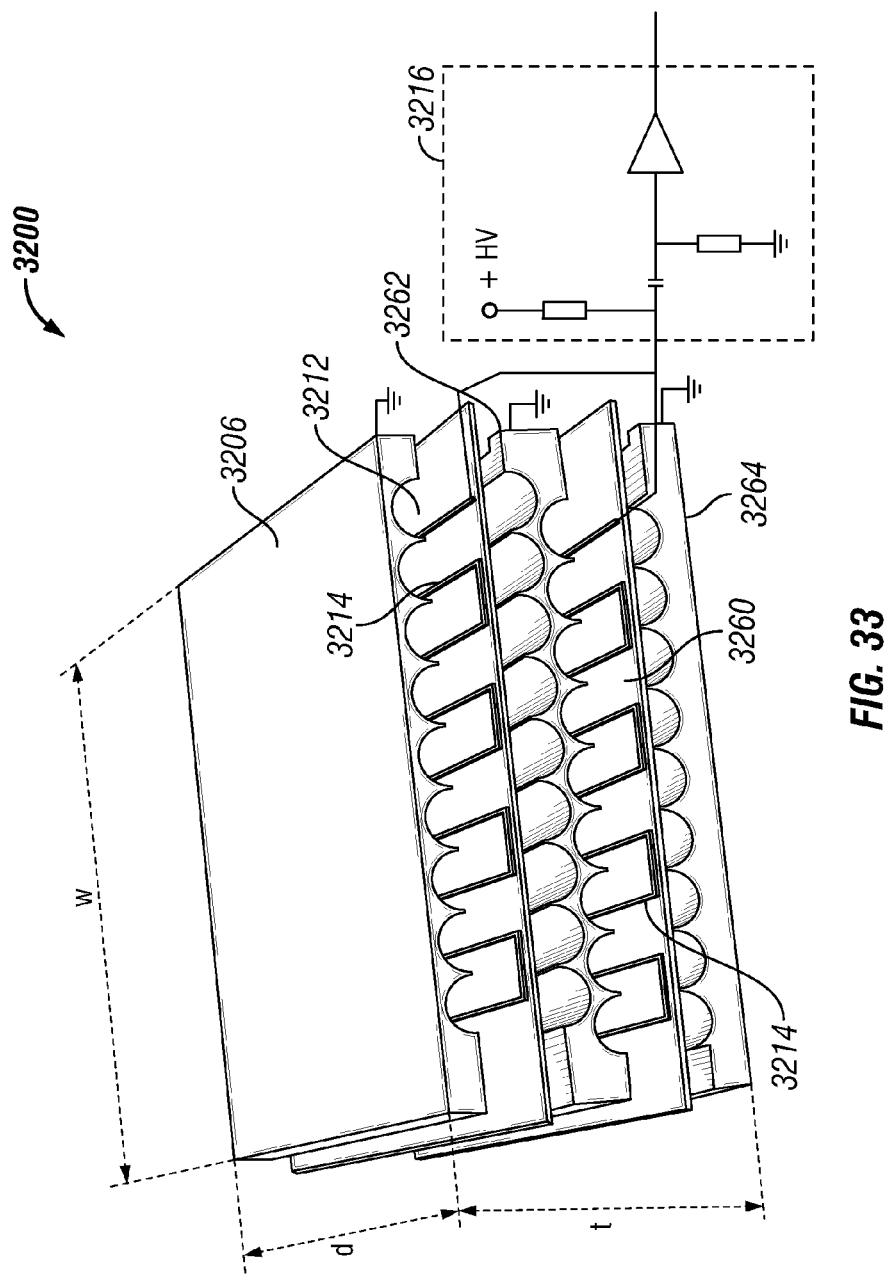
FIG. 33 shows a perspective view of the stacked configuration shown in FIG. 32.

Various embodiments of the present disclosure are also directed to other stacked configurations. FIG. 32 shows a stacked configuration 3200 in accordance with another embodiment of the present disclosure. In FIG. 32, the radiation detector 3200 is a hybrid of the modules shown in FIGS. 15 and 20. In particular, the radiation detector 3200 includes a first supporting layer 3212 and a second supporting layer 3260. The supporting layers include conductive pathways 3214 on each of their sides. The radiation detector 3200 also includes three cathodes: (1) a top cathode 3206 with bottom parallel recesses 3232, (2) a central cathode 3262 with top and bottom parallel recesses 3232, and (3) a bottom cathode 3264 with top parallel recesses 3232. Each of the recesses 3232 is aligned with a corresponding parallel section 3220 of the conductive pathway 3214. FIG. 33 shows a perspective view of the stacked configuration 3200 shown in FIG. 32. The stacked configuration 3200 and the components of the radiation detector (e.g., cathodes and supporting layers) have a depth (d), a width (w), and a thickness (t). In illustrative embodiments, the depth is between 1 cm and 1 m, the width is between 5 mm and 10 cm, and the thickness is between 5 mm and 10 cm, resulting in a packages size in the range of 250 cubic millimeters to 10,000 cubic centimeters. Such dimensions may vary and depend on, for example, the number of modules that are stacked together. These dimensions and sizes are illustrative and are not intended to limit the scope of the disclosure.

The electronics and the modules can be coupled using a variety of different configurations. For example, as shown in FIG. 33, the conductive pathways 3214 on the first supporting layer 3266 and the second supporting layer 3260 are connected to a single amplifier within the electronics 3216. In other embodiments, the conductive pathways 3214 are coupled to separate amplifiers and/or the outputs from the electronics are interpreted separately by a processor.

In some embodiments, the housing is omitted from the radiation detector. The embodiments of the radiation detector, shown in, for example, FIGS. 1, 31, 32, and 33, use a housing 103, 3103, 3203 to contain the components of the radiation detector (e.g., cathodes and supporting layers). The housing defines an interior volume by sealing the components from the exterior environment. Using the housing to seal the interior volume may reduce design complexity and manufacturing costs. In additional or alternative embodiments, the interior volume is defined by the components of the radiation detector. For example, the cathodes and the supporting layers define an interior volume and seal the interior volume from the exterior environment. To this end, in some embodiments, a gasket or a sealing material (not shown) is disposed between adjacent cathodes and supporting layers to create a seal from the exterior environment.

Figure 35:
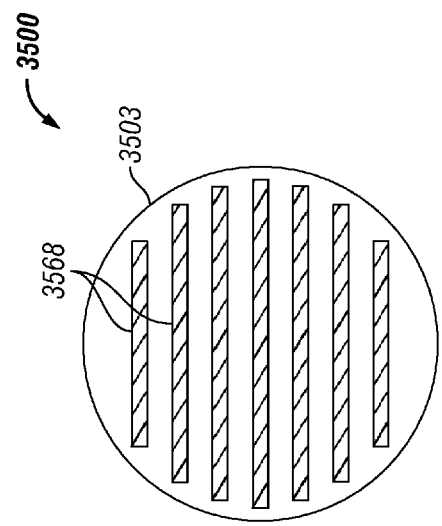
FIG. 35 shows a radiation detector with a circular form in accordance with another embodiment of the present disclosure.
Figure 34:
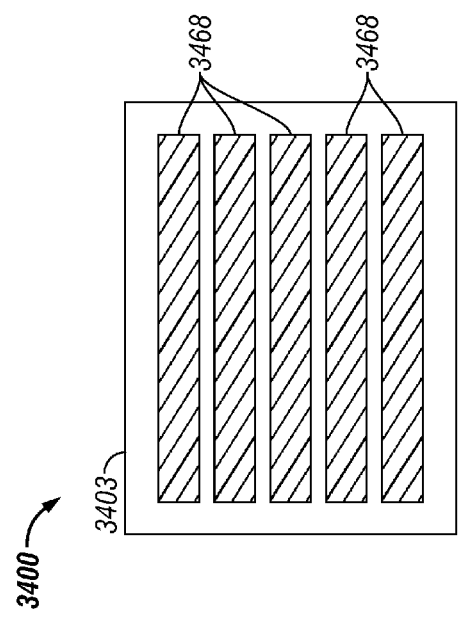
FIG. 34 shows a radiation detector with a rectangular form in accordance with one embodiment of the present disclosure.
Figure 36:
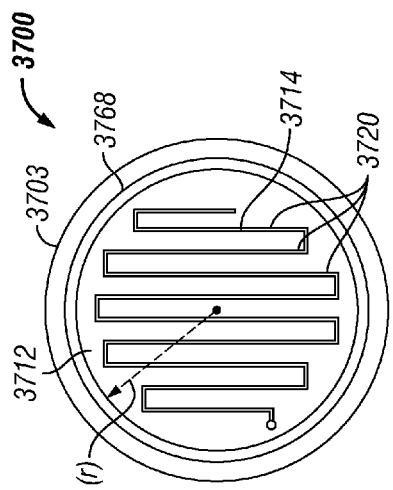
FIG. 36 shows a radiation detector with a semi-circular form in accordance with yet another embodiment of the present disclosure.

In illustrative embodiments of the present disclosure, the radiation detector can have various different forms (e.g., shapes and geometries) to accommodate different applications. A number of modules (e.g., 2, 5, 10 and/or 20) can be stacked together in various configurations to increase the fill factor of each form. For example, FIG. 34 shows a radiation detector 3400 with a rectangular form. In this embodiment, the radiation detector 3400 has a rectangular cross section. A housing 3403 contains five modules 3468 that are stacked together in a parallel manner. In various embodiments, the modules can be advantageously stacked together to fill more irregular forms. FIG. 35 shows a cross section of a radiation detector 3500 with a circular form. The radiation detector 3500 includes a cylindrical housing 3503 that contains seven modules 3568 stacked together in a parallel manner. Each module has a different width (w) so that the module can better fill the circular cross section of the detector 3500. In another example, FIG. 36 shows a cross section of a radiation detector 3600 with a semi-circular form. In this case, a housing 3603 with a semi-circular form contains five modules 3668 that have varying widths to advantageously increase the fill factor for the form.

Figure 37:
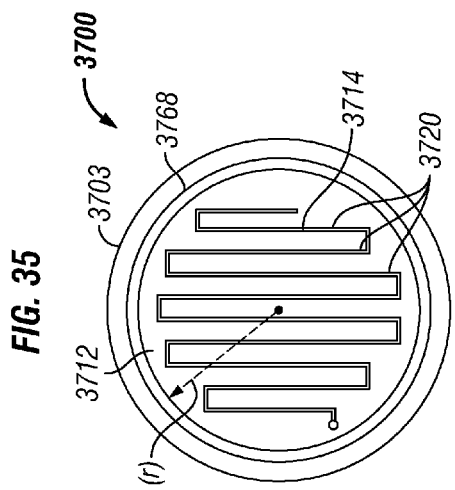
FIG. 37 shows a radiation detector with modules that are transverse to a longitudinal axis of the detector in accordance with one embodiment of the present disclosure.

In various alternative embodiments, the modules of the radiation detector are arranged within the radiation detector so that the largest planar geometries of the modules (e.g., as defined by the width (w) dimension and the depth (d) dimension) are transverse to a longitudinal axis of the housing, as opposed to FIGS. 34, 35, and 36, where the largest planar geometries of the modules are parallel to longitudinal axes of the housing (e.g., the longitudinal axes are in-and-out of the page in FIGS. 34, 35, and 36). FIG. 37 shows a cross section of a radiation detector 3700 with modules 3768 that are transverse to a longitudinal axis of the detector. The radiation detector includes a cylindrical housing 3703 having a longitudinal axis (e.g., the longitudinal axis is in-and-out of the page). The detector 3700 includes a number of detection modules 3768 with circular geometries (e.g., defined by a radius (r) dimension) that are stacked along the longitudinal axis of the cylindrical housing 3703. The largest planar geometries of the modules 3768 (e.g., as defined by the radius (r) dimension) are transverse to the longitudinal axis of the housing 3703. The circular geometries of the modules 3768 advantageously fill the cylindrical housing 3703. FIG. 37 also shows a circular supporting layer 3712 that is disposed within one of the modules 3768. The supporting layer 3712 includes a conductive pathway 3714 that corresponds to a pattern with a plurality of parallel sections 3720. By altering the lengths of each section, the pattern of the conductive pathway 3714 efficiently fills the area of the circular supporting layer 3712.

Figure 38:
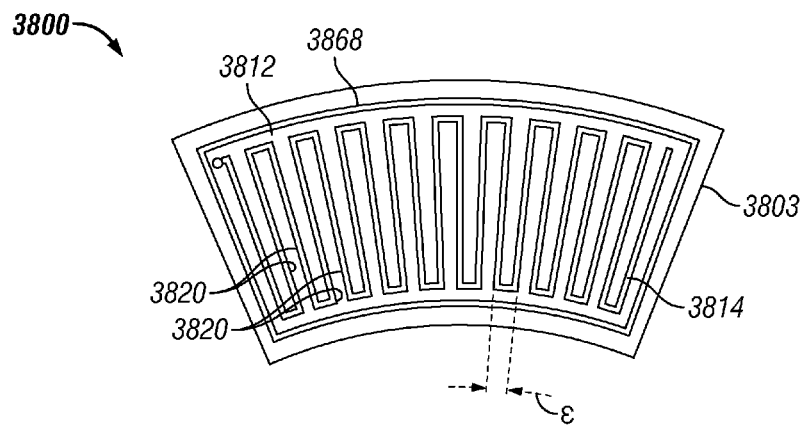
FIG. 38 shows a radiation detector with modules that are transverse to a longitudinal axis of the detector in accordance with another embodiment of the present disclosure.

FIG. 38 shows a cross section of a radiation detector 3800 with modules 3868 that are transverse to a longitudinal axis of the detector in accordance with another embodiment of the present disclosure. The radiation detector 3800 includes a housing 3803 with a curved shape and each detection module 3868 has a similar curved shape. The modules 3868 are stacked along the longitudinal axis of the housing 3803 (e.g., the longitudinal axis is in-and-out of the page in FIG. 38) and the planar geometries of the modules 3868 are transverse to the longitudinal axis of the housing 3803. A supporting layer 3812 is disposed within each of the modules 3868. The supporting layer 3812 includes a conductive pathway 3814 that includes a pattern with a plurality of sections 3820. In this case, each section 3820 of the pattern has an angular offset ($\epsilon$) so that the pattern efficiently fills the area of the curved supporting layer 3812. As shown in FIGS. 34-37, each detector module can have various geometries and stacking configurations to most efficiently fill a particular form (e.g., shape and geometry) of the housing.

Figure 39:
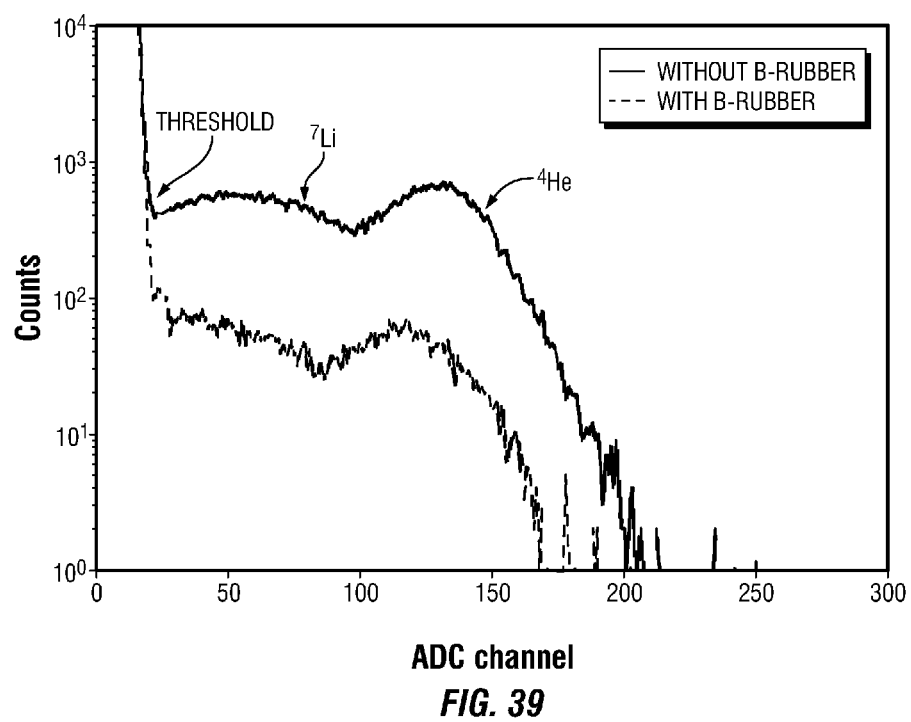
FIG. 39 shows a plot of radiation detector counts as a function of ADC channel number in accordance with one embodiment of the present disclosure.

FIG. 39 shows a plot of radiation detector counts as a function of ADC channel number in accordance with one embodiment of the present disclosure. This plot was obtained using a radiation detector that included a conversion layer with a thickness of 1 μm. The conversion layer included an isotope of boron ($^{10}B$) that was coated onto a cathode. The detector also included a PCB supporting layer with a copper conductive pathway (e.g., traces). The conductive pathway had a width of 50 μm and a thickness of 17 μm. A bias voltage of 500 V was applied to the conductive pathway for providing an electrical field. A moderated americium-beryllium (AmBe) neutron source was used to emit neutrons towards the detector. An analog-to-digital convertor (ADC) was used to convert an output of the detector into digital form (e.g., ADC channel number). In this manner, detected neutron events with different pulse amplitudes were converted and then binned into ADC channels (represented by a solid curve). The solid curve includes two visible peaks above a threshold. The area under each peak represents contributions of $^{7}Li$ ions and $^{4}He$ ions, respectively. These ions are products of a neutron capture reaction with the $^{10}B$ atoms within the conversion layer, as previously explained. To positively demonstrate the sensitivity of the detector to neutrons, this process was then repeated for three other configurations: (1) four layers of boronized rubber having thicknesses of 6 mm inserted between the neutron source and the detector (represented by the dashed curve), (2) a Cs-137 gamma source used instead of the AmBe neutron source (curve not shown), and (3) no source (curve not shown). The boronized rubber layers captured neutrons before reaching the detector. This configuration resulted in a reduced neutron flux of about 90%. As compared with the solid curve, the dashed curve shows that the counts produced by the detector were reduced by 90% (e.g., roughly 10% of the counts in the solid curve). The third and fourth configurations did not produce many counts above the threshold and their representative curves were omitted for this reason.

Figure 40:
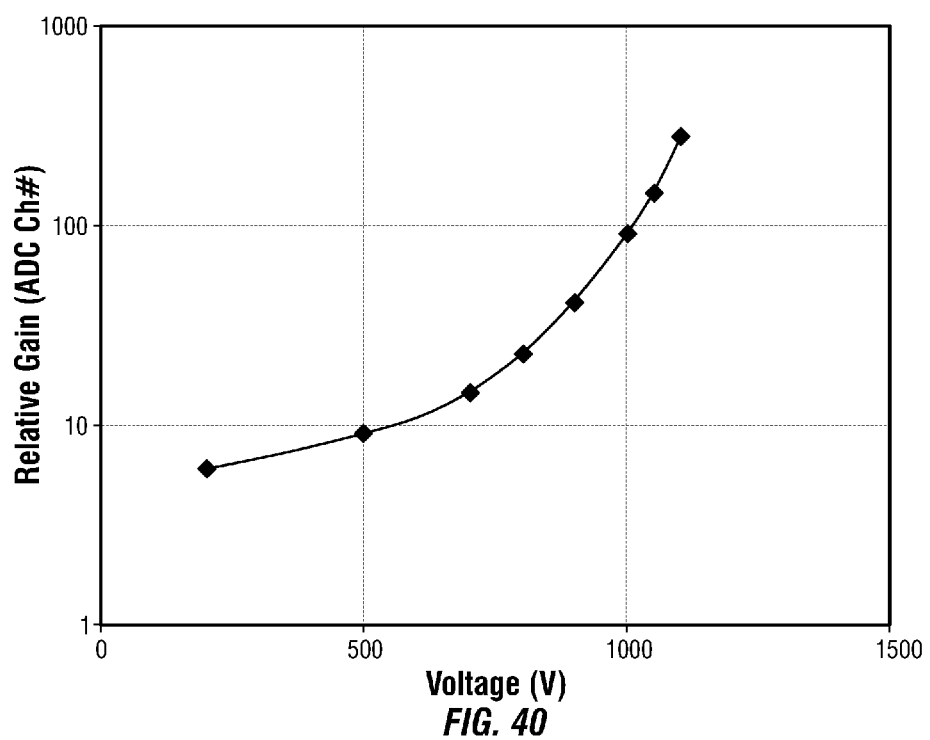
FIG. 40 shows a plot of relative gain versus bias voltage in accordance with one embodiment of the present disclosure.

FIG. 40 shows a plot of relative gain versus bias voltage in accordance with one embodiment of the present disclosure. This plot was obtained using a radiation detector as described with respect to FIG. 39. In this case, the bias voltage applied to the conductive pathway was varied between 200 V to 1100 V. The relative gain shown in FIG. 40 was computed from an averaged ADC channel number for neutron spectra above the threshold weighted by respective count in each channel, (e.g., average pulse heights of neutron events). The gain was normalized to that of the spectrum taken at 1100 V. As shown previously in FIG. 6, the number of electrons and ions in the gas detector will increase correspondingly with the bias voltage applied to the conductive pathway. Depending on specific configurations, for alpha particles, the avalanches induced near the conductive pathway can increase the number of electrons and ions available for collection by two orders of magnitude within the proportional region. FIG. 40 shows that the pulse amplitudes at 1100V were enhanced by roughly a factor of 50 in comparison with the amplitudes at 200V. This large gain in pulse amplitudes facilitates the detection of neutrons, especially in a downhole environment where a connecting electronic amplifier faces challenges in recording low-amplitude events at high temperatures.

Figure 41:
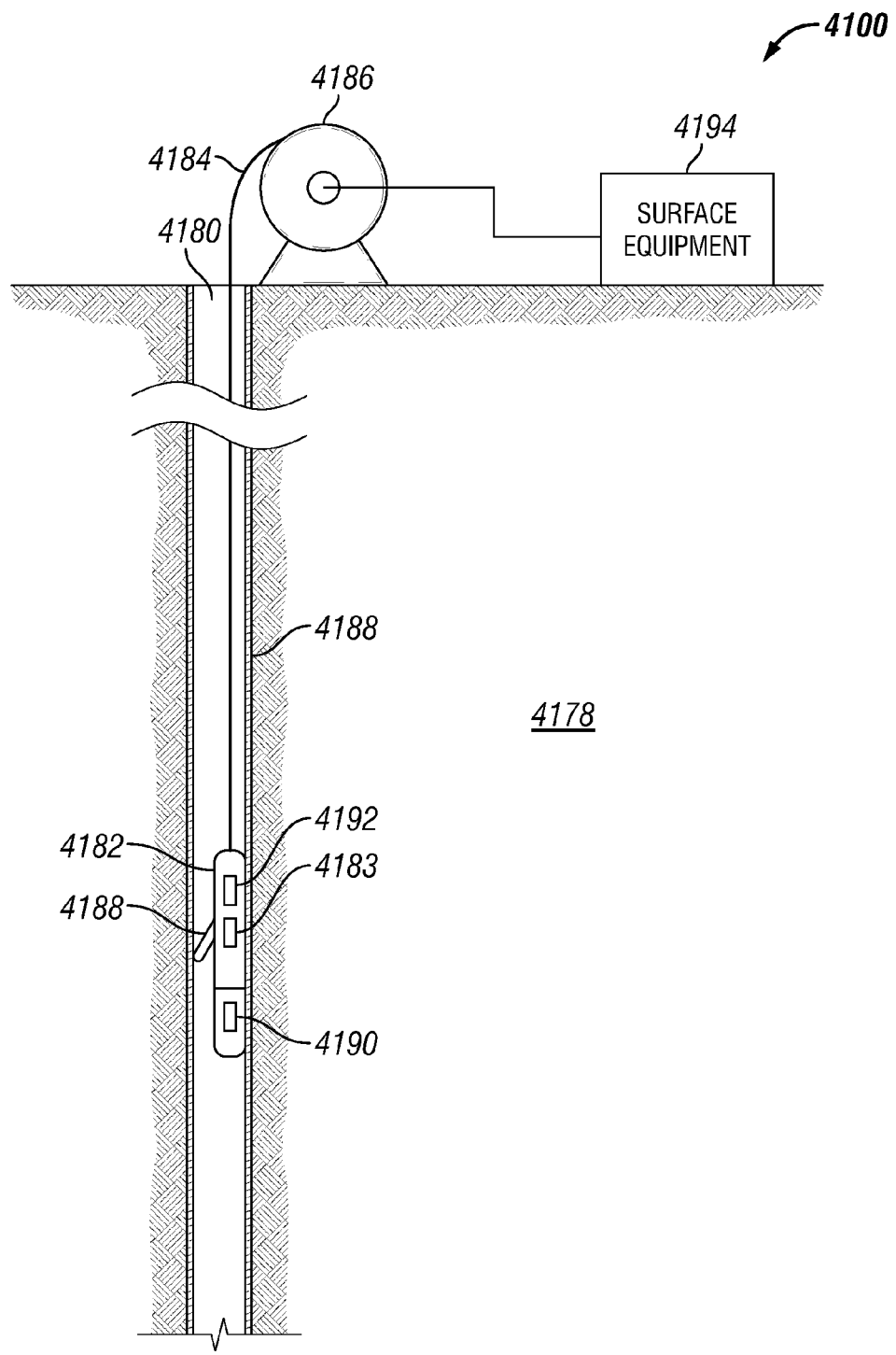
FIG. 41 shows a wireline system for evaluating a substance in accordance with one embodiment of the present disclosure.

Illustrative embodiments of the present disclosure are directed to oil field and gas field applications. For example, FIG. 41 shows a wireline system 4100 for evaluating a substance in accordance with one embodiment of the present disclosure. The wireline system 4100 is used to investigate, in situ, a substance within an earth formation 4178 surrounding a borehole 4180 to determine a characteristic of the substance (e.g., characteristics of solids and liquids within the formation). As shown in FIG. 41, the borehole 4180 traverses the earth formation 4178. A wireline tool 4182 is disposed within the borehole 4180 and suspended on an armored cable 4184. A length of the cable 4184 determines the depth of the wireline tool 4182 within the borehole 4180. The length of cable is controlled by a mechanism at the surface, such as a drum and winch system 4186. In some embodiments, a retractable arm 4188 is used to press the wireline tool 4182 against a borehole wall 4188. As shown in FIG. 41, the wireline tool 4182 includes a neutron source 4190. The wireline tool 4182 also includes a number of neutron detectors (e.g., 1, 2, 3, or 5). In this embodiment, the wireline tool 4182 includes a first neutron detector 4192 and a second neutron detector 4183. The neutron detectors 4192, 4183 correspond to any one of the exemplary radiation detectors described in FIGS. 1-40.

The wireline system 4100 further includes surface equipment 4194 for supporting the wireline tool 4182 within the borehole 4180. In various embodiments, the surface equipment 4186 includes a power supply for providing electrical power to the wireline tool 4182. The surface equipment 4194 also includes an operator interface for communicating with the neutron source 4190 and/or the neutron detectors 4192, 4183. In some embodiments, the wireline tool 4182 and operator interface communicate through the armored cable 4184. Furthermore, although the wireline tool 4182 is shown as a single body in FIG. 41, the tool may alternatively include separate bodies.

Figure 42:
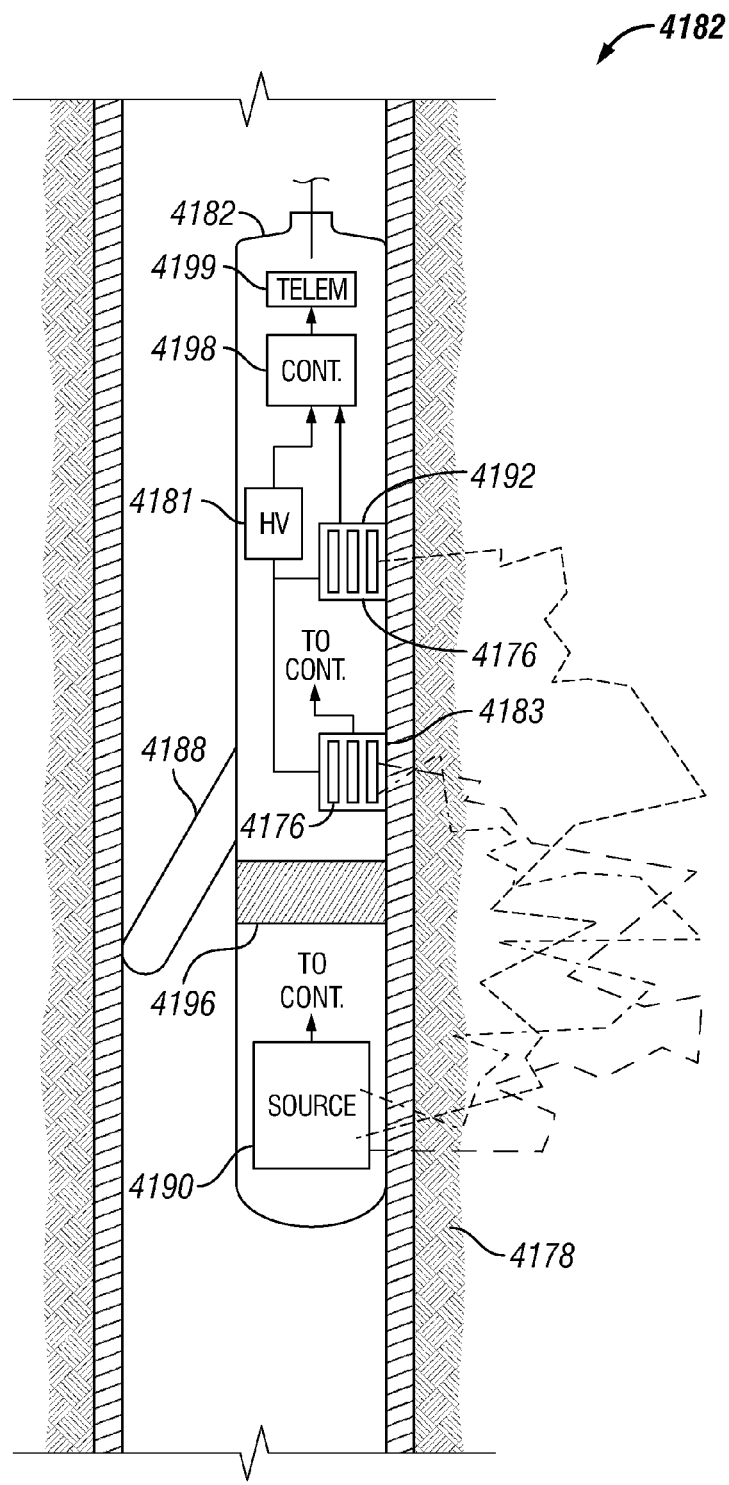
FIG. 42 shows a detailed view of the wireline tool shown in FIG. 41.

FIG. 42 shows a detailed view of the wireline tool 4182 shown in FIG. 41. As explained above, the wireline tool 4182 includes a neutron source 4190 for emitting neutrons into the earth formation 4178. In accordance with exemplary embodiments of the present disclosure, the neutron source 4190 is a chemical source (e.g., AmBe or Californium). In various other embodiments, the neutron source 4190 is a neutron generator, such as an electronic neutron generator. Electronic neutron generators are advantageous in terms of radiation safety and environmental safety. In one specific embodiment, the neutron generator 4190 is a pulsed neutron generator that emits successive pulses of neutrons. The neutron generator 4190 may include a deuterium-tritium accelerator tube which can be operated in pulsed mode to provide repetitive pulses or bursts of essentially mono-energetic neutrons (e.g., with energies of 14 MeV neutrons). In some embodiments, the deuterium-tritium accelerator tube provides on the order of $10^{+8}$ neutrons per second. In various embodiments, a pulsing circuit (not shown) provides electrical pulses, which are timed in a manner to cause the neutron generator to repetitively emit neutron pulses of a preferred width (e.g., approximately 10 microseconds duration). In various embodiments, a pulsed neutron generator can produce larger neutron fluxes as compared to chemical sources. Larger neutron fluxes may provide for precise counting statistics and/or higher logging speeds. Furthermore, a pulsed neutron generator can be used for extracting additional borehole formation information, such as formation "hydrogen index" or "sigma", based on particular pulse timing and pulse sequences.

The wireline tool 4182 also includes the first neutron detector 4192 (e.g., a far neutron detector) and the second neutron detector 4183 (e.g., a near neutron detector). The detectors 4192, 4183 have different spacings from the source 4190 so that the detectors produce a ratio of count rates that can be used to reduce borehole effects for neutron porosity logging. In various embodiments, the neutron detectors 4192, 4183 detect at least one of thermal neutrons (e.g., about 0.025 eV) and epithermal neutrons (e.g., between about 0.4 eV and about 10 keV). In the exemplary embodiment shown in FIG. 42, each of the neutron detectors 4192, 4183 includes three detection modules 4176 that are stacked together in a parallel manner. The wireline tool 4182 and neutron detectors 4192, 4183 are configured so that the largest outer surface area (e.g. width (w) times the depth (d)) of each detector module 4176 faces the formation 4172. Exemplary detection modules 4176 are described in FIGS. 1-33 of the present description.

The wireline tool 4182 also includes a shield 4196 disposed between the neutron source 4190 and the neutron detectors 4192, 4183. The shield 4196 prevents neutrons from traveling directly though the tool 4182 to the neutron detectors 4192 4183. In various embodiments, the neutron shield 4196 may include a dense material with a high atomic number, such as tungsten. In additional or alternative embodiments, the shield 4192 may include a material with high neutron cross section, such as boron, boron carbide, and/or boron-loaded materials.

As explained above, when neutrons strike the neutron detectors 4192, 4183 neutron events will occur and electrical signals (e.g., pulses) will be generated within the detectors. These electrical signals will be amplified by electronics and then output to a processor. The output from the electronics characterizing the neutron events and the parameters of the output (e.g., count rate and amplitude) can be used by the processor to measure characteristics of the formation (e.g., formation neutron porosity measurements, formation hydrogen index measurements, and formation sigma measurements).

In illustrative embodiments, the wireline tool 4182 includes components that support the operation of the neutron source 4190 and neutron detectors 4192, 4183. For example the wireline tool 4182 includes a high voltage power supply 4181 that provides or distributes power to the neutron detectors 4192, 4183. The wireline tool 4182 also includes a control unit 4198 that is coupled to the neutron source 4190 and/or the neutron detectors 4192, 4183. In illustrative embodiments, the control unit 4198 is coupled to the electronics, which are components of the detectors 4192, 4183. In other embodiments, the electronics are components of the control unit 4198. The control unit 4198 may also be coupled to a telemetry module 4199 so that the wireline tool 4198 can communicate with surface equipment 4194. The control unit 4198 communicates the amplified output, characterizing neutron events, from the electronics to the surface equipment 4194 via the telemetry module 4199. In such an embodiment, the surface equipment 4194 may include a processor configured to interpret the amplified output. In various other embodiments, the control unit 4198 includes a processor that interprets the amplified output. In illustrative embodiments of the present disclosure, such processing (e.g., amplifying output and interpreting output) can be performed downhole within the wireline tool 4182 and/or uphole within the surface equipment 4194.

While two neutron detectors 4192, 4183 are shown in FIGS. 41 and 42, illustrative embodiments of the present disclosure may include other numbers of detectors within the wireline tool 4182 (e.g., 1, 3, 5, and 7). The detectors 4192, 4183 may also have various different configurations within the wireline tool 4182. In one example, the two detectors 4192, 4183 are located on the same side of the wireline tool 4182 relative to the neutron source 4190 (e.g. above the neutron source). In another illustrative embodiment, the first neutron detector 4192 is located above the neutron source 4190 and a second detector 4183 is located below the neutron source. In some embodiments, the detectors are mounted side-by-side and are equidistant from the source 4190. In further illustrative embodiments, the neutron source 4190 is positioned towards an upper end of the tool 4182, while the detectors 4192, 4183 are positioned towards a lower end of the tool. The relative positioning of the neutron sources and detectors shown in any of the embodiments described herein is not intended to limit the scope of the disclosure.

Figure 43:
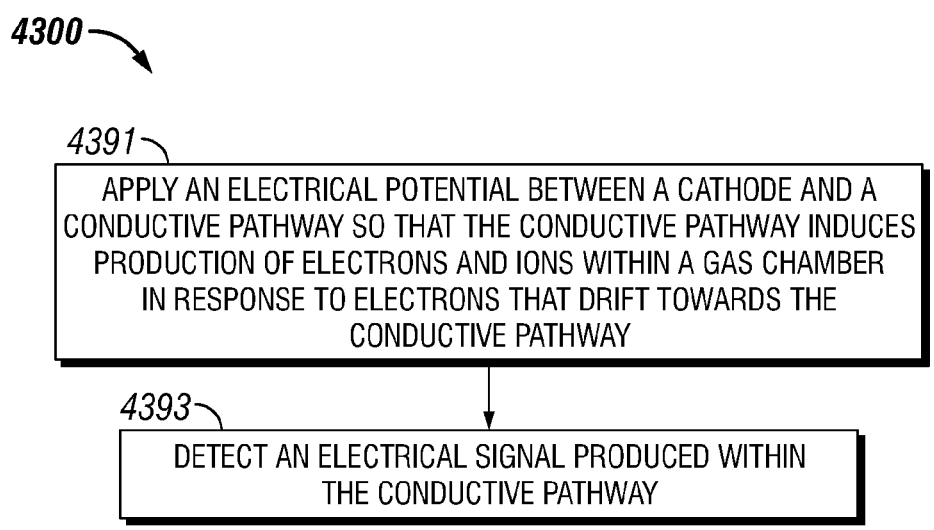
FIG. 43 shows a method for detecting radiation using a radiation detector in accordance with one embodiments of the present disclosure.

Illustrative embodiments of the present disclosure are also directed to methods for detecting radiation. FIG. 43 shows a simplified method for detecting radiation using a radiation detector. The radiation detector can be one of the exemplary radiation detectors described in FIGS. 1-42. The radiation detector includes a gas chamber that contains a gas (e.g., fill gas). The chamber also includes a cathode and a supporting layer with a conductive pathway. Before a first process 4391 of the method is performed, the radiation detector may be positioned in a specific location to detect radiation. For example, the radiation detector may be positioned within a borehole to perform an analysis of an earth formation during a neutron logging operation. In the specific example shown in FIGS. 41 and 42, two radiation detectors are disposed within a wireline tool and lowered into the borehole. The method then begins at process 4391 when an electrical potential is applied between the cathode and the conductive pathway so that the conductive pathway induces production of electrons and ions within the gas chamber in response to electrons that drift towards the conductive pathway. As radiation (e.g., charged particles) travel through the gas, the radiation produces electrons and ions between the cathode and the conductive pathway. In some embodiments, the radiation-of-interest (e.g., neutron radiation) first passes through a conversion layer that converts the radiation into secondary charged particles. These secondary charged particles then travel through the gas and produce electrons and ions. Due to the applied electrical potential, the ions will drift towards the cathode, while the electrons will drift toward the conductive pathway. The conductive pathway will induce production of electrons and ions within the gas chamber via an avalanche in response to electrons that drift towards the conductive pathway. These avalanches generate electrical signals (e.g., electrical pulses) within the conductive pathway.

The method continues to process 4393 which detects the electrical signals produced within the conductive pathway. As explained above, the electrical signals generated within the conductive pathway can be amplified by electronics and then output to a processor. The processor interprets the output and identifies electrical signals (e.g., electrical pulses) within the output. This detection process can be performed by, for example, the processor 126 shown in FIG. 1. Illustrative embodiments of the present disclosure are not limited to wireline systems, such as the ones shown in FIGS. 41 and 42. For example, illustrative embodiments can also be used with any suitable means of conveyance, such coiled tubing. Various embodiments of the present disclosure may also be applied in logging-while-drilling (LWD) systems (e.g., a LWD tool), measuring-while-drilling systems (e.g., MWD tools), or any other system within a borehole tool where radiation detection is performed.

The term "processor" should not be construed to limit the embodiments disclosed herein to any particular device type or system. The processor may include a computer system. The computer system may include a computer processor (e.g., a microprocessor, microcontroller, digital signal processor, or general purpose computer). The computer system may also include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Any of the methods and processes described above, including processes and methods for (1) interpreting an output from electronics, (2) detecting an electrical signal within the output, (3) counting electrical signals within the output, and (4) measuring characteristics of a formation, can be implemented as computer program logic for use with the computer processor.

The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a computer readable medium (e.g., memory) and executed by the computer processor.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A radiation detector, comprising:
   a gas chamber, comprising:
      a gas that responds to ionizing particles by producing electrons and ions;
      a cathode that attracts ions;
      a supporting layer; and
   a conductive pathway extending lengthwise a distance along a surface of the supporting layer that faces the cathode, the conductive pathway comprising a cross section that is uniform along the distance, wherein the conductive pathway is configured to collect electrons and respond to electrons that drift towards the conductive pathway by inducing production of further electrons and ions within the gas.

2. The radiation detector of claim 1, further comprising:
   a power source coupled to the conductive pathway, wherein the power source generates an electric field between the cathode and the conductive pathway.

3. The radiation detector of claim 2, wherein the electric field responds to electrons that drift towards the conductive pathway by inducing an electron and ion avalanche.

4. The radiation detector of claim 1, wherein the supporting layer and the conductive pathway are a single component.

5. The radiation detector of claim 1, further comprising:
   an amplifier electrically coupled to the conductive pathway and configured to generate an output representative of an electrical signal produced by electrons collected at the conductive pathway, by ions that drift away from the conductive pathway, or by both.

6. The radiation detector of claim 1, wherein the gas is selected from the group consisting of: helium-3, helium-4, argon, xenon, boron tri-fluoride, and a combination thereof.

7. The radiation detector of claim 1, further comprising:
   a quenching gas within the gas chamber.

8. The radiation detector of claim 1, wherein the conductive pathway comprises a pattern with a plurality of sections.

9. The radiation detector of claim 1, wherein the detector comprises a plurality of cathodes.

10. The radiation detector of claim 9, wherein the detector comprises a plurality of supporting layers comprising conductive pathways.

11. The radiation detector of claim 10, wherein the plurality of cathodes and the plurality of supporting layers comprise a stacked configuration.

12. The radiation detector of claim 1, further comprising:
a conversion layer on the cathode, wherein the conversion layer converts radiation into the ionizing particles.

13. The radiation detector of claim 12, wherein the conversion layer includes an isotope selected from the group consisting of: boron, lithium, gadolinium, and a combination thereof.

14. The radiation detector of claim 1, wherein the radiation detector is configured to detect neutrons.

15. The radiation detector of claim 1, wherein the radiation detector includes a plurality of detection modules comprise a stacked configuration.

16. The radiation detector of claim 15, wherein the radiation detector comprises a semi-circular cross section.

17. The radiation detector of claim 1, wherein the gas chamber is hermetically sealed.

18. A radiation detector, comprising:
a gas chamber, comprising:
a gas that responds to ionizing particles by producing electrons and ions;
a cathode that attracts ions;
a supporting layer; and
a conductive pathway extending a length along a surface of the supporting layer and comprising a cross section that is uniform along the length, wherein the conductive pathway is configured to collect electrons and respond to electrons that drift towards the conductive pathway by inducing production of further electrons and ions within the gas, wherein the supporting layer is a printed circuit board and the conductive pathway is a trace on the printed circuit board.

19. A radiation detector, comprising:
a gas chamber comprising
a gas that responds to ionizing particles by producing electrons and ions;
a cathode that attracts ions; and
a supporting layer comprising a conductive pathway that collects electrons and responds to electrons that drift towards the conductive pathway by inducing production of further electrons and ions within the gas,
wherein the conductive pathway comprises a pattern with a plurality of sections, and
wherein the cathode includes a plurality of recesses and each recess corresponds to each of the sections of the conductive pathway.

20. The radiation detector of claim 19, wherein each parallel recess comprises a semi-circular shape.

21. The radiation detector of claim 19, wherein each parallel recess comprises a rectangular shape.

22. The radiation detector of claim 19, wherein each parallel recess comprises a triangular shape.

23. The radiation detector of claim 19, wherein the supporting layer comprises a second conductive pathway that comprises a pattern with a plurality of sections and a section of the second conductive pathway is disposed between sections of the conductive pathway.

24. A neutron detector, comprising:
a gas chamber, comprising:
a neutron conversion layer that converts neutrons into ionizing particles;
a gas that responds to the ionizing particles by producing electrons and ions;
a cathode that attracts ions;
a supporting layer; and
a conductive pathway extending lengthwise a distance along a surface of the supporting layer that faces the cathode, the conductive pathway comprising a cross section that is uniform along the distance, wherein the conductive pathway is configured to collect electrons and respond to electrons that drift towards the conductive pathway by inducing production of further electrons and ions within the gas.

25. The neutron detector of claim 24, further comprising:
a power source coupled to the conductive pathway, wherein the power source generates an electric field between the cathode and the conductive pathway.

26. The neutron detector of claim 24, further comprising:
an amplifier electrically coupled to the conductive pathway and configured to amplify at least one electric signal produced by electrons collected at the conductive pathway, by ions that drift away from the conductive pathway, or by both.

27. The neutron detector of claim 24, wherein the conductive pathway forms a pattern.

28. A neutron detector, comprising:
a gas chamber, comprising:
a neutron conversion layer that converts neutrons into ionizing particles;
a gas that responds to the ionizing particles by producing electrons and ions;
a cathode that attracts ions;
a supporting layer; and
a conductive pathway extending a length along a surface of the supporting layer and comprising a cross section that is uniform along the length, wherein the conductive pathway is configured to collect electrons and respond to electrons that drift towards the conductive pathway by inducing production of further electrons and ions within the gas, wherein the supporting layer is a printed circuit board and the conductive pathway is a trace on the printed circuit board.

29. A method for detecting radiation using a radiation detector that comprises a gas chamber, a cathode, a supporting layer, and a conductive pathway, the method comprising:
applying an electrical potential between the cathode and the conductive pathway, wherein the conductive pathway induces production of electrons and ions within the gas chamber in response to electrons that drift towards the conductive pathway and wherein the conductive pathway extends lengthwise a distance along a surface of the supporting layer that faces the cathode, the conductive pathway comprising a cross section that is uniform along the distance; and
detecting an electric signal produced within the conductive pathway.

30. The method of claim 29, further comprising:
converting radiation into ionizing particles that travel through the gas chamber.

* * * * *